United States Patent
Kikkawa et al.

(10) Patent No.: US 7,464,397 B2
(45) Date of Patent: Dec. 9, 2008

(54) STREAMING CONTENT RECEIVING APPARATUS AND PLAYBACK APPARATUS WITH STOPPING OF RECEPTION OF SECOND STREAMING DATA DURING PERIOD IN WHICH FIRST STREAMING PROGRAM IS SELECTED

(75) Inventors: Teruki Kikkawa, Kanagawa (JP);
Takashi Yamamoto, Kanagawa (JP);
Atsushi Mizutome, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 953 days.

(21) Appl. No.: 10/770,553

(22) Filed: Feb. 4, 2004

(65) Prior Publication Data

US 2004/0179811 A1 Sep. 16, 2004
US 2008/0181572 A2 Jul. 31, 2008

(30) Foreign Application Priority Data

Feb. 5, 2003 (JP) .............................. 2003-028667
Feb. 2, 2004 (JP) .............................. 2004-025348

(51) Int. Cl.
*H04N 7/14* (2006.01)
(52) U.S. Cl. ...................................... 725/100; 725/134
(58) Field of Classification Search .................. 386/83; 725/43, 86, 87, 95, 96, 100, 131, 134; 348/569, 348/906, 706; 709/218, 219
See application file for complete search history.

(56) References Cited

U.S. PATENT DOCUMENTS

| | | | | |
|---|---|---|---|---|
| 4,488,179 A | * | 12/1984 | Kruger et al. | 348/706 |
| 6,058,242 A | * | 5/2000 | Kim | 386/83 |
| 6,651,089 B1 | * | 11/2003 | Stead | 709/217 |
| 6,842,724 B1 | * | 1/2005 | Lou et al. | 703/6 |
| 2002/0138829 A1 | | 9/2002 | Matsumoto et al. | 725/14 |
| 2002/0157094 A1 | | 10/2002 | Saito et al. | 725/38 |
| 2003/0142236 A1 | | 7/2003 | Aratani et al. | 348/554 |
| 2003/0208778 A1 | | 11/2003 | Aratani et al. | 725/139 |

FOREIGN PATENT DOCUMENTS

JP 2001-309258 11/2001

* cited by examiner

*Primary Examiner*—David E Harvey
(74) *Attorney, Agent, or Firm*—Fitzpatrick, Cella, Harper & Scinto

(57) ABSTRACT

A receiving apparatus includes a receiver that receives a signal for playing back a program, a storage device that stores the signal received by the receiver, and a controller that, during a period in which a first program is selected, starts control for starting reception of a signal for playing back a second program different from the first program, and, when a predetermined portion of signals for playing back the second program is stored in the storage device during the period in which the first program is selected, stops reception of another portion of the signals for playing back the second program.

9 Claims, 28 Drawing Sheets

FIG. 12B

|  | (2) | (2) | (2) | (2) |
|---|---|---|---|---|
| 1005 | (1) | (1) | (1) | (2) |
|  | (1) | ⋮ | (1) | (2) |
|  | (1) | (1) | (1) | (2) |

FIG. 12A

| 1002 | (3) | (3) | (3) | (3) |
|---|---|---|---|---|
|  | (2) | (2) | (2) | (3) |
|  | (1) | (1) | (2) | (3) |
| 1005 | ⋮ | (1) | (2) | (3) |

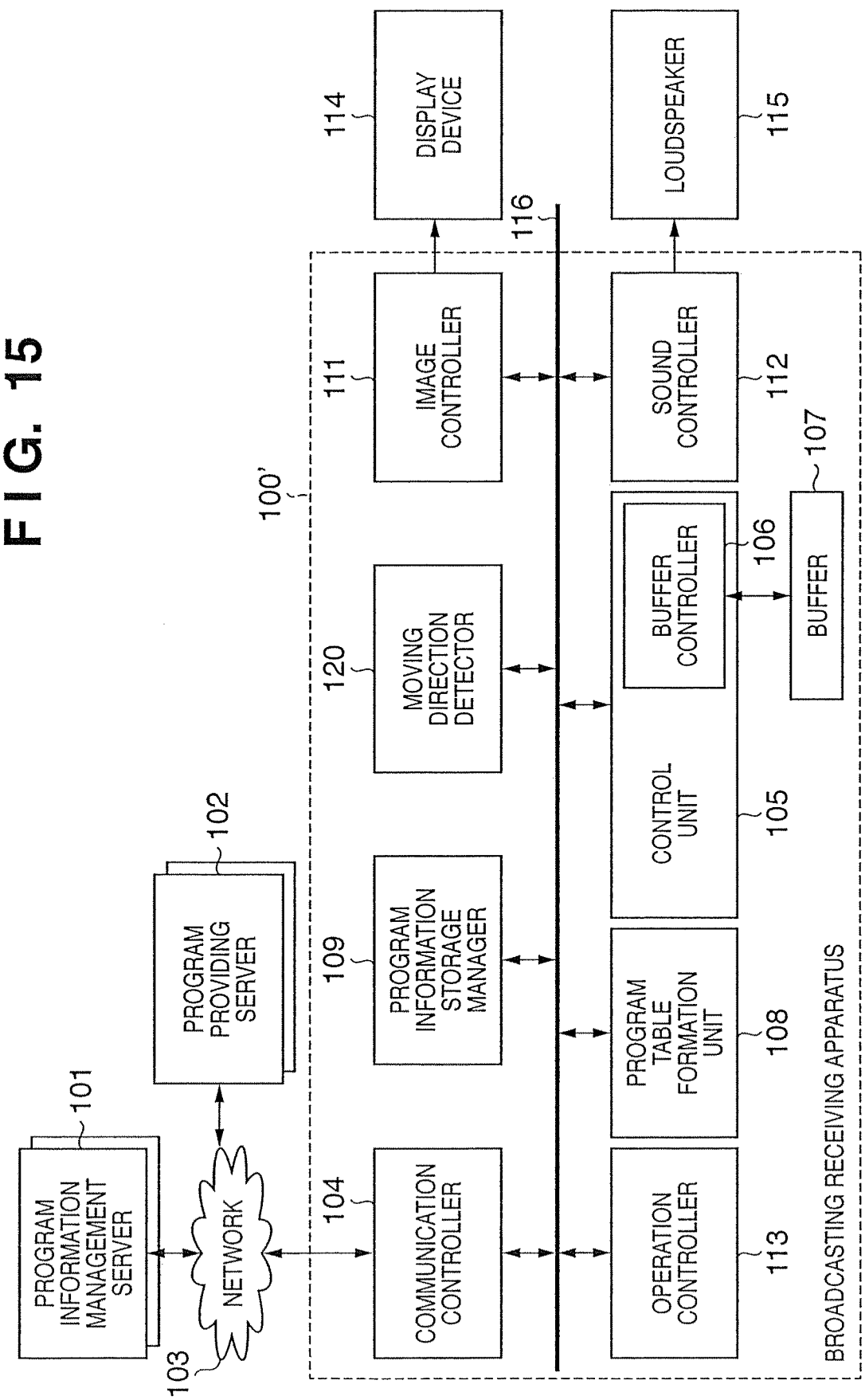

FIG. 16A
| PROGRAM NAME | CONTENTS |
|---|---|
| ···(1) | ··· |
| ···(2) | ··· |
| ···(3) | ··· |
| ···(4) | ··· |
| ···(5) | ··· |
| ···(6) | ··· |
| ···(7) | ··· |
FIG. 16B
MOVING DIRECTION OF FOCUS ⬇
| PROGRAM NAME | CONTENTS |
|---|---|
| ···(1) | ··· |
| ···(2) | ··· |
| ···(3) | ··· |
| ···(4) | ··· |
| ···(5) | ··· |
| ···(6) | ··· |
| ···(7) | ··· |
FIG. 16C
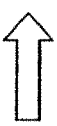
MOVING DIRECTION OF FOCUS ⬆
| PROGRAM NAME | CONTENTS |
|---|---|
| ···(1) | ··· |
| ···(2) | ··· |
| ···(3) | ··· |
| ···(4) | ··· |
| ···(5) | ··· |
| ···(6) | ··· |
| ···(7) | ··· |

FIG. 17A

| PROGRAM ID | WEIGHT OF BUFFER AMOUNT |
|---|---|
| 1 | 4 |
| 2 | 4 |
| 3 | 4 |
| 4 | 4 |
| 5 | 4 |
| 6 | 4 |
| 7 | 4 |

FIG. 17B

| PROGRAM ID | WEIGHT OF BUFFER AMOUNT |
|---|---|
| 1 | 1 |
| 2 | 1 |
| 3 | 1 |
| 4 | 3 |
| 5 | 5 |
| 6 | 4 |
| 7 | 4 |

FIG. 17C

| PROGRAM ID | WEIGHT OF BUFFER AMOUNT |
|---|---|
| 1 | 4 |
| 2 | 5 |
| 3 | 3 |
| 4 | 1 |
| 5 | 1 |
| 6 | 1 |
| 7 | 1 |

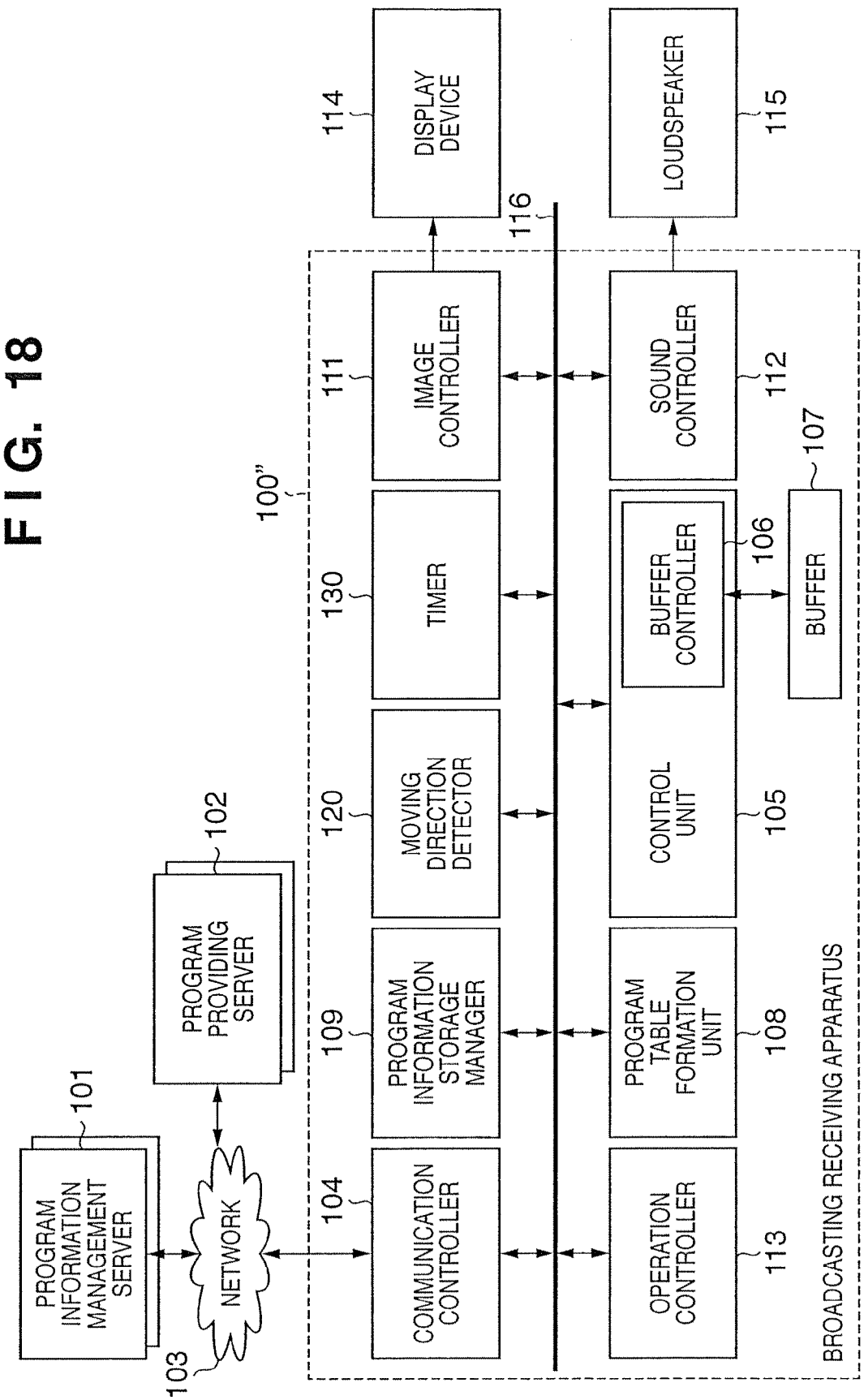

FIG. 20A

| (4) | (4) | (4) | (4) |
|---|---|---|---|
| (0) | (4) | (0) | (0) |
| (0) | (4) | (0) | (0) |
| (0) | (4) | (0) | (0) |

FIG. 20B

| (0) | (1) | (0) | (0) |
|---|---|---|---|
| (0) | (3) | (0) | (0) |
| (0) | (5) | (0) | (0) |
| (0) | (4) | (0) | (0) |

FIG. 20C

| (0) | (1) | (0) | (0) |
|---|---|---|---|
| (0) | (3) | (0) | (0) |
| (4) | (4) | (4) | (4) |
| (0) | (4) | (0) | (0) |

FIG. 20D

| (0) | (0) | (0) | (0) |
|---|---|---|---|
| (0) | (0) | (0) | (0) |
| (1) | (3) | (5) | (4) |
| (0) | (0) | (0) | (0) |

FIG. 20E

| (0) | (0) | (4) | (0) |
|---|---|---|---|
| (0) | (0) | (4) | (0) |
| (1) | (3) | (5) | (4) |
| (0) | (0) | (4) | (0) |

# STREAMING CONTENT RECEIVING APPARATUS AND PLAYBACK APPARATUS WITH STOPPING OF RECEPTION OF SECOND STREAMING DATA DURING PERIOD IN WHICH FIRST STREAMING PROGRAM IS SELECTED

FIELD OF THE INVENTION

The present invention relates to a receiving apparatus for processing signals for playing back programs and a playback apparatus using the receiving apparatus.

BACKGROUND OF THE INVENTION

Television receivers and radio receivers are conventionally known as program playback apparatuses. Arrangements for transmitting and receiving programs across networks are also known. In an arrangement like this, programs can be played back by a computer having a function of transmitting and receiving data across a network. Streaming is one technique which distributes video and audio programs across networks. That is, streaming is a technology by which one side transmits data such as video and audio data and at the same time the other side receives and plays back the transmitted data across the Internet or an intranet.

Japanese Patent Laid-Open No. 2001-309258 has as its object to quickly output images in response to television channel switching instructions, and discloses a technique which selects data corresponding to television channels adjacent to a television channel to be received, and decompresses video and audio signals in parallel.

SUMMARY OF THE INVENTION

The present inventor made extensive studies on an arrangement by which when video and/or audio programs to be watched and/or listened to are switched, the newly selected program can be immediately played back. As a consequence, the present inventor found that while a predetermined program is being selected, if the reception of signals for playing back programs different from the selected program is started, any of these programs can be immediately played back. In particular, the present inventor found that in order to realize this arrangement, storage control for storing signals for playing back programs different from the selected program is important. It is an object of the present invention to realize favorable program change by performing novel control.

According to the present invention, the foregoing object is attained by providing a receiving apparatus comprising: a receiver that receives a signal for playing back a program; a storage device that stores the signal received by said receiver; and a controller that, during a period in which a first program is selected, starts control for starting reception of a signal for playing back a second program different from the first program, and, when a predetermined portion of signals for playing back the second program is stored in said storage device during the period in which the first program is selected, stops reception of another portion of the signals for playing back the second program.

According to the present invention, the foregoing object is also attained by providing a receiving apparatus comprising: a receiver that receives a signal for playing back a program; a storage device that stores the signal received by said receiver; and a controller that, during a period in which a first program is selected, performs control for receiving signals for playing back second and third programs different from the first program, wherein storage capacities allocated to store the signals for playing back the second and third programs during the period in which the first program is selected are different.

The foregoing object is also attained by providing a program playback apparatus comprising: the above receiving apparatus; and a perceiving apparatus for playing back a program on the basis of a signal received by said receiving apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 12A and 12B are views for explaining the distance on the program table according to the third embodiment of the present invention;

FIG. 15 is a block diagram showing the configuration of a system including a broadcasting receiving apparatus according to a fifth embodiment of the present invention;

FIGS. 16A to 16C are views showing the allocation of buffer amounts according to the fifth embodiment of the present invention;

FIGS. 17A to 17C are views showing the allocation of buffer amounts according to the fifth embodiment of the present invention;

FIG. 18 is a block diagram showing the configuration of a system including a broadcasting receiving apparatus according to a sixth embodiment of the present invention;

FIGS. 20A to 20E are views showing the allocation of buffer amounts according to the sixth embodiment of the present invention;

DETAILED DESCRIPTION OF THE PREFERRED EMBODIMENTS

Figure 1:
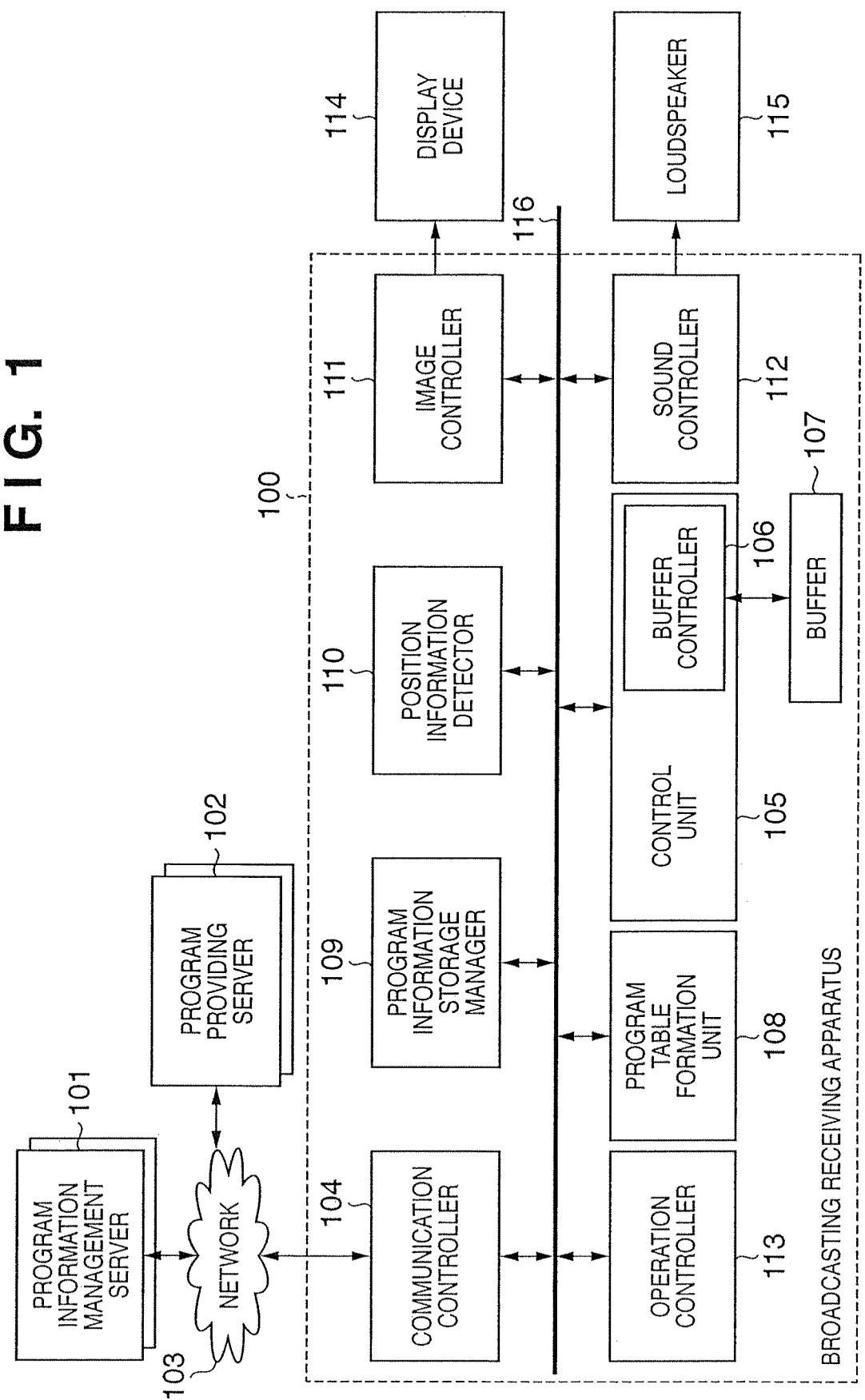
FIG. 1 is a block diagram showing the configuration of a system including a broadcasting receiving apparatus according to a first embodiment of the present invention.

Preferred embodiments of the present invention will now be described in detail in accordance with the accompanying drawings.

In the embodiments, a receiving apparatus is constructed as follows. That is, the receiving apparatus comprises a receiver that receives a signal for playing back a program, a storage device that stores the signal received by the receiver, and a controller that starts control for starting reception of a signal for playing back a second program different from a first program during a period in which the first program is selected, and, when a predetermined portion of signals for playing back the second program is stored in the storage device during the period in which the first program is selected, stops reception of another portion of the signals for playing back the second program.

A transmission source includes a transmitter such as a server for actually transmitting signals, and a transmission manager such as a management server for allowing the transmitter to transmit signals.

By performing control for starting the reception of signals for playing back the second program while the first program is being selected, or by storing the signals for playing back the second program in addition to the above control, it is possible to shorten the time before the playback of the second program is started after the state in which the first program is selected is switched to the state in which the second program is selected. In a conventional arrangement which performs streaming playback of an audio program or motion image program, the playback of the program is started when a predetermined amount of signals are stored in a buffer. In this embodiment, after a predetermined portion of the signals for playing back the second program is stored, control is so performed as to stop the reception of another portion of the signals. This makes it possible to avoid starting playback of the second program during the period in which the first program is selected. The other portion of the signals for playing back the second program is not necessarily the whole portion other than the predetermined portion.

In the receiving apparatus described above, a program is a set of pieces of information to be perceived in order at predetermined timings with the lapse of time by a perceiving apparatus, for example, a display such as a CRT or flat panel display or a sound wave generator such as a loudspeaker.

In the receiving apparatus described above, for stopping the reception of the other portion of the signals for playing back the second program, an arrangement which transmits information for performing the stoppage to a transmission source of the second program may be preferably used. This control for stopping the reception of the other portion of the signals for playing back the second program may also be simple stoppage of the reception. However, as the control for stopping the reception of the other portion of the signals for playing back the second program, the control which transmits information for performing the stoppage to the transmission source of the second program is more desirable. More specifically, information for requesting the stoppage of transmission is transmitted. For example, when a certain program is to be played back, if the receiving apparatus simply stops the reception, the transmission source may keep transmitting a portion other than signals for playing back the program. In a case like this, a load is applied on the transmission source. Also, if the program is an object of charging, charging may occur although the other portion described above is not played back. Even when the program is not an object of charging, if the transmission source is performing control for inhibiting repetitive transmission to a specific receiving party, the other portion may not be received when the other portion is to be continuously played back after the portion of the signals for playing back the program. These inconveniences can be avoided when the receiving apparatus transmits information for stopping the transmission to the transmission source.

In the above invention, it is possible to preferably use an arrangement in which the control for starting the reception of the signals for playing back the second program includes at least control for requesting a transmission source of the second program to transmit at least a portion of the signals for playing back the second program.

In the above invention, it is also possible to preferably use an arrangement in which the predetermined portion is an amount with which automatic playback of the second program is not started.

In the above receiving apparatus, the control circuit preferably starts control for starting reception of signals for playing back a third program different from the first and second programs during the period in which the first program is selected, and, when a predetermined portion of the signals for playing back the third program is stored in the storage device during the period in which the first program is selected, performs control for stopping reception of another portion of the signals for playing back the third program. Also, when a second predetermined amount as a portion of the signals for playing back the second program is stored in the storage device during the period in which the first program is selected, the control circuit preferably performs control for stopping reception of another portion of the signals for playing back the second program, and, when a third predetermined amount as a portion of the signals for playing back the third program is stored in the storage device during the period in which the first program is selected, the control circuit performs control for stopping reception of another portion of the signals for playing back the third program, the second and third predetermined amounts being different signal amounts. Furthermore, the second and third programs preferably satisfy a relationship in which an operation amount when a state in which the first program is selected is switched to a state in which the third program is selected is larger than an operation amount when the state in which the first program is selected is switched to a state in which the second program is selected, the second predetermined amount being larger than the third predetermined amount. The operation amount is the number of times an operation key is pressed to select a program, or the distance a pointer is moved to select a program. According to another arrangement, the third program is a program selected before the first program is selected, the first program is selected by operating a predetermined operation key from a state in which the third program is selected, the second program is a program selected by performing the same operation on the operation key from a state in which the first program is selected, and the second predetermined amount is larger than the third predetermined amount.

The receiving apparatus according to the embodiments also includes the following arrangement. That is, the receiving apparatus is characterized by comprising a receiver that receives a signal for playing back a program, a storage device that stores the signal received by the receiver, and a controller that performs control for receiving signals for playing back second and third programs different from a first program during a period in which the first program is selected, wherein storage capacities allocated to store the signals for playing back the second and third programs during the period in which the first program is selected are different.

It is possible to preferably use an arrangement in which the second and third programs satisfy a relationship in which an operation amount necessary to select the second program is smaller than an operation amount necessary to select the third program in a state in which the first program is selected and the storage capacity allocated to store the second program is larger than the storage capacity allocated to store the third program, or an arrangement in which the third program is a program selected before the first program is selected, the first program is selected by operating a predetermined operation key from a state in which the third program is selected, the second program is a program selected by performing the same operation on the operation key from a state in which the first program is selected, and the storage capacity allocated to store the second program is larger than the storage capacity allocated to store the third program.

The embodiments includes a program playback apparatus comprising any of the receiving apparatuses described above, and a perceiving apparatus for playing back a program on the basis of a signal received by the receiving apparatus.

Practical embodiments of the above arrangements will be explained below.

First Embodiment

FIG. 1 is a block diagram showing the configuration of a system including a broadcasting receiving apparatus to which a streaming receiving/playback method according to the first embodiment of the present invention is applied.

In FIG. 1, a broadcasting receiving apparatus 100, program information management servers 101, and program providing servers 102 are communicably connected across a network 103.

The program information management server 101 has a function of distributing, onto the network 103, at least the URL of the program providing server 102 pertaining to streaming contents and information concerning the program name and distribution date, as information (to be referred to as a "content list" hereinafter) required to form a scheduled broadcasting program table (to be described later).

The program providing server 102 is a server which provides streaming content data. The program providing server 102 has a function of holding streaming data containing motion image data, sound data, and the like, and distributing the streaming data onto the network 103.

The broadcasting receiving apparatus 100 according to the first embodiment includes a communication controller 104, control unit 105, program table formation unit 108, program information storage manager 109, position information detector 110, image controller 111, sound controller 112, and operation controller 113, all of which are connected by a bus 116. The apparatus 100 also includes a buffer 107 which is controlled by a buffer controller 106 in the control unit 105. A display device 114 and loudspeaker 115 are connected to the broadcasting receiving apparatus 100 via the image controller 111 and sound controller 112, respectively.

The communication controller 104 has a receiver for receiving streaming data, and controls transmission and reception between the broadcasting receiving apparatus 100 and network 103 in accordance with a predetermined communication protocol. As for the communication protocol, a protocol suited for streaming distribution is used. Such protocol includes, inter alia, TCP/IP (Transport Control Protocol/Internet Protocol), UDP (User Datagram Protocol), or RTP (Realtime Transport Protocol). The form of connection can be either a continuous connection or a temporal dial-up connection.

The control unit 105 has a CPU (Central Processing Unit) as its main component, and includes the buffer controller 106 as the most characteristic feature of the first embodiment. The control unit 105 also has functions of controlling and managing the communication controller 104, program table formation unit 108, program information storage manager 109, position information detector 110, image controller 111, sound controller 112, and operation controller 113 via the bus 116, and performing buffering during streaming. In addition, the control unit 105 includes a controller for controlling the reception of streaming data, and has a function of requesting, via the communication controller 104, the program providing server 102 to transmit/stop streaming data.

The buffer controller 106 performs area control for the buffer 107 as a storage device for received streaming data. Also, as the characteristic feature of the first embodiment, the buffer controller 106 has a function of optimally allocating the buffer 107 not only to a program currently being viewed but also to a plurality of other programs managed by the program information storage manager 109. The buffer control method will be described in detail later.

The program table formation unit 108 has a function of forming a program table on the basis of the content list stored in the program information storage manager 109. The program table formed by the program table formation unit 108 is displayed on the display device 114 to a user by using a GUI (Graphical User Interface). The form of the displayed program table will be explained in detail later.

The program information storage manager 109 has functions of storing the content lists obtained from the program information management server 101 across the network 103, and providing a necessary content list to the program table formation unit 108 as needed.

The position information detector 110 detects the position of a selection candidate indication (to be referred to as a "Focus" hereinafter) and the positions of candidate programs other than the focused content on a program table formed by the program table formation unit 108, and calculates the distance on the program table. The method of calculating the distance on the program table will be described later.

The image controller 111 has functions of displaying, on the display device 114, image data buffered by the control unit 105, and displaying, on the display device 114, a program table formed by the program table formation unit 108.

The sound controller 112 has a function of outputting sound data buffered by the control unit 105 to the loudspeaker 115.

The operation controller 113 has a function of transmitting operation information from a user to the control unit 105.

Figure 2:
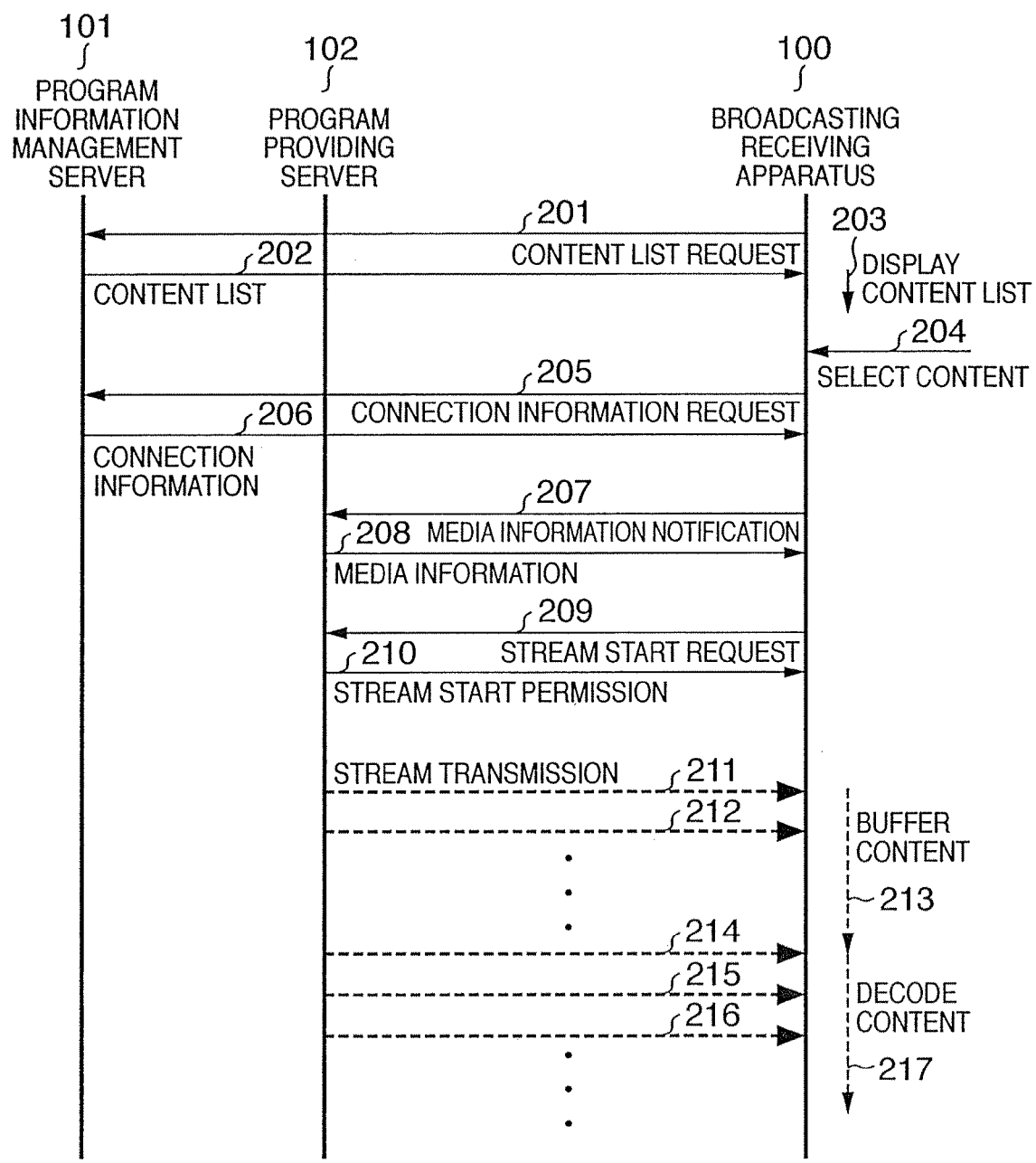
FIG. 2 is a view showing transactions among servers and the broadcasting receiving apparatus during streaming playback.

FIG. 2 shows transactions among the servers for performing streaming distribution and the broadcasting receiving apparatus for performing streaming playback, when streaming playback is to be performed between the apparatuses having the above arrangements.

First, the broadcasting receiving apparatus 100 requests the program information management server 101 to distribute a content list of streaming contents currently being broadcast (201). In accordance with this request from the broadcasting receiving apparatus 100, the program information management server 101 distributes the content list to the broadcasting receiving apparatus 100 (202). The broadcasting receiving apparatus 100 forms a scheduled broadcasting program table on the basis of the received content list, and presents this table as the content list to the user (203). The content list describes information for specifying each program, and may include the titles of programs, texts for introducing performers, and graphical data. The user selects a content on the presented content list (204).

The broadcasting receiving apparatus 100 requests the program information management server 101 to transmit connection information linked to the content selected by the user (205). The connection information describes, e.g., the URL (Uniform Resource Locator) of the program providing server, the type of decoder to be used for the content, a protocol for accessing the content, and information pertaining to the connection destination. The number of the connection information is not necessarily one for one content; a plurality of pieces of connection information sometimes exist depending on streaming media such as images and sounds.

When this connection information is transmitted from the program information management server 101 to the broadcasting receiving apparatus 100 (206), the broadcasting receiving apparatus 100 activates a player for streaming playback, and transfers the connection information to the player. On the basis of the transferred connection information, the player opens a two-way connection by, for example, TCP/IP (Transmission Control Protocol/Internet Protocol) to the program providing server 102. This enables control by RTSP (Real Time Streaming Protocol).

The broadcasting receiving apparatus 100 which has opened the connection to the program providing server 102 notifies media information (207). The media information describes a connection protocol for streaming media distribution, a receivable port number of the broadcasting receiving apparatus 100, and the like. Further, when receiving the media information from the program providing server 102 (208), the broadcasting receiving apparatus 100 sends a stream start request to the program providing server 102 (209).

The program providing server 102 which has received this stream start request opens a one-way UDPC (User Datagram Protocol) connection to the player in accordance with RTSP instructions (210), and starts transmitting the content (211 to 216). The broadcasting receiving apparatus 100 starts buffering (213) when receiving the content, and starts playback by the player (217) when completing buffering of an amount of the content necessary for the playback.

The operation of the broadcasting receiving apparatus 100 according to the first embodiment will be described below with reference to a flow chart shown in FIG. 3.

When the power supply of the broadcasting receiving apparatus 100 is turned on by pressing a power button (not shown) or by an ON-operation using a remote controller (not shown), the broadcasting receiving apparatus 100 is initialized (step S300). In this initialization, the hardware and software of the broadcasting receiving apparatus 100 are reset. If program information stored in the program information storage manager 109 is not the latest one or no program information is stored (YES in step S301), the control unit 105 sends a program information request to the program information management server 101 via the communication controller 104 and the network 103. The program information management server 101 distributes, onto the network 103, information of at least program names and offering dates pertaining to streaming contents, as information necessary to form a content list, and the communication controller 104 acquires a content list. The acquired content list is stored in the program information storage manager 109 (step S302).

If a program table display instruction is confirmed and a program table presentation request from the user is received by the operation controller 113 (YES in step S303), the flow advances to step S304, and the control unit 105 transfers the content list stored in the program information storage manager 109 to the program table formation unit 108. The program table formation unit 108 forms a program table (to be described later) on the basis of the received content list. The thus formed program table is processed into a form corresponding to the display device 114 by the image controller 111 and presented to the user.

The user operates various switches or a remote controller of the broadcasting receiving apparatus 100 to vertically move the Focus in the presented program table, and selects a desired program by operating an enter key or the like.

If the program is selected (YES in step S305), the control unit 105 requests the acquisition of the connection information (e.g., the URL) of the program providing server 102 which provides the selected streaming content. The program information management server 101 which has received this request distributes the connection information onto the network 103, and the communication controller 104 acquires the connection information. When receiving the connection information, the control unit 105 notifies the program providing server 102 of media information such as the connection protocol for streaming media distribution, and the receivable port number of the broadcasting receiving apparatus 100. Upon receiving the stream start request, the program providing server 102 opens a one-way UDP connection to the player in accordance with RTSP instructions, and starts transmitting the content. The broadcasting receiving apparatus 100 receives the content and starts buffering (step S306).

The control unit 105 then determines whether the data of the thus selected program is stored in the buffer 107 as will be described later (step S307). In the first embodiment as will be described later, a predetermined amount of data of a program currently being selected and other programs in a program table is stored in the buffer 107. When streaming broadcasting is received, however, for the first time after the power is turned on, or when program data storage has not been complete yet, no data may exist in the buffer 107. The processing in this step is executed to determine a situation like this.

If the data of the selected program is already stored in the buffer 107, the buffer controller 106 reads out this data of the selected program from the buffer 107, and starts outputting the data to the image controller 111 (step S308). After that, the control unit 105 determines whether a period corresponding to a data amount allocated to the program has elapsed (step S310). If the predetermined period has elapsed and the remaining amount of data stored in the buffer 107 becomes small, the control unit 105 outputs, to the image controller 111, the data received by the communication controller 104 and stored in the buffer 107 when the connection is started in step S306, instead of the data stored beforehand in the buffer 107 (step S311). The control unit 105 stops the display of the program table, and displays the image of the selected program on the display device 114.

The switching timing is set by determining the read start position of the data output from the communication controller 104 and stored in the buffer 107, such that the data naturally continues to the last portion of the data stored beforehand in the buffer 107.

The control unit 105 determines whether the playback of the program content is complete (step S312). If YES in step S312, the control unit 105 determines whether the power is turned off (step S313).

If the data of the selected program is not stored in the buffer 107 in step S307, outputting of the data is started after data whose amount is sufficient to play back the content is stored in the buffer 107 (step S309).

Figure 4:
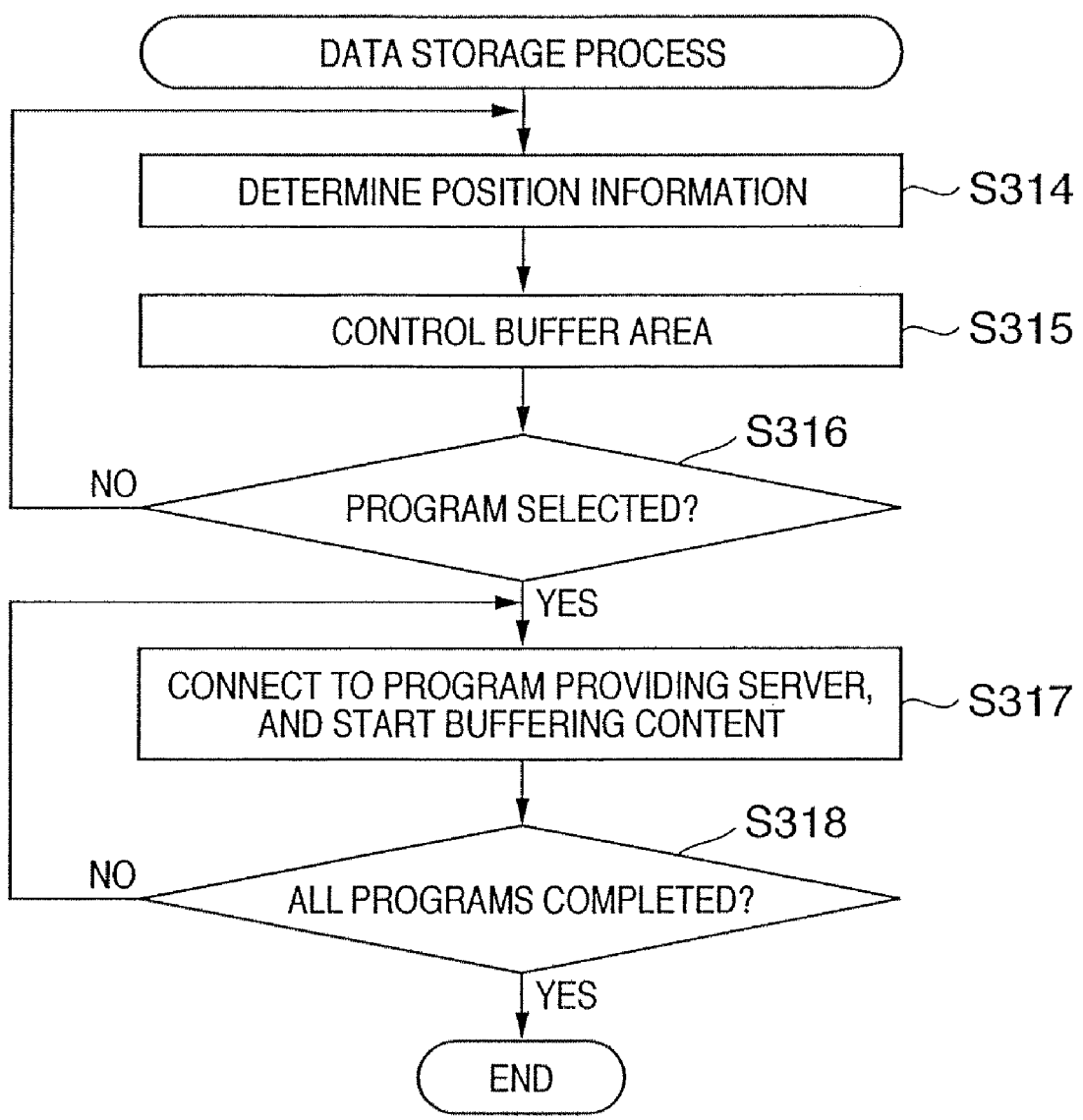
FIG. 4 is a flow chart showing a data storage process according to the first embodiment of the present invention.

In the first embodiment, when the program table is displayed in step S304, processing shown in FIG. 4 is performed in parallel with the processing after step S304.

First, when the Focus is moved by a user's operation, the position information detector 110 detects the position of the focused streaming content (program to be viewed) and the positions of a plurality of other candidate programs on the program table, and calculates the distance to each candidate program from the focused program on the program table (step S314). A selection candidate program and the distance on the program table will be explained in detail later.

Subsequently, the buffer controller 106 performs area control (buffer amount control) for the buffer 107 for streaming playback of candidate programs (step S315). Details of the method of controlling the buffer 107 will be described later.

If the program at which the Focus is currently positioned is selected by an operation of the enter key or the like in step S315, the flow advances to step S316. Determination in step S316 corresponds to the determination in step S305 of FIG. 3. If the Focus moves without selecting any program, the flow returns to step S314 to repeat the area control process for the buffer 107 in accordance with the position of the Focus.

If the program is selected (YES in step S316), the control unit 105 requests the connection information described above, notifies media information, and connects to the program providing server 102 in accordance with the connection protocol for a candidate program, other than the selected program, and starts buffering the streaming content of the candidate program (step S317). Details of the operation in step S317 will be described later.

When buffering of a buffer amount allocated by the buffer controller 106 is complete, the processing in step S317 is repeated for the next candidate program (step S318). The number of candidate programs can be set by the broadcasting receiving apparatus 100 and may be variable.

If the Focus position is changed and a program is selected by the operation of the enter key while steps S317 and S318 are being executed, it is also possible to interrupt the processing currently being executed, and return to step S314.

Details of the program table presenting method, the distance on the program table, and the buffer amount control will be explained below.

(Program Table Presenting Method)

Figure 5:
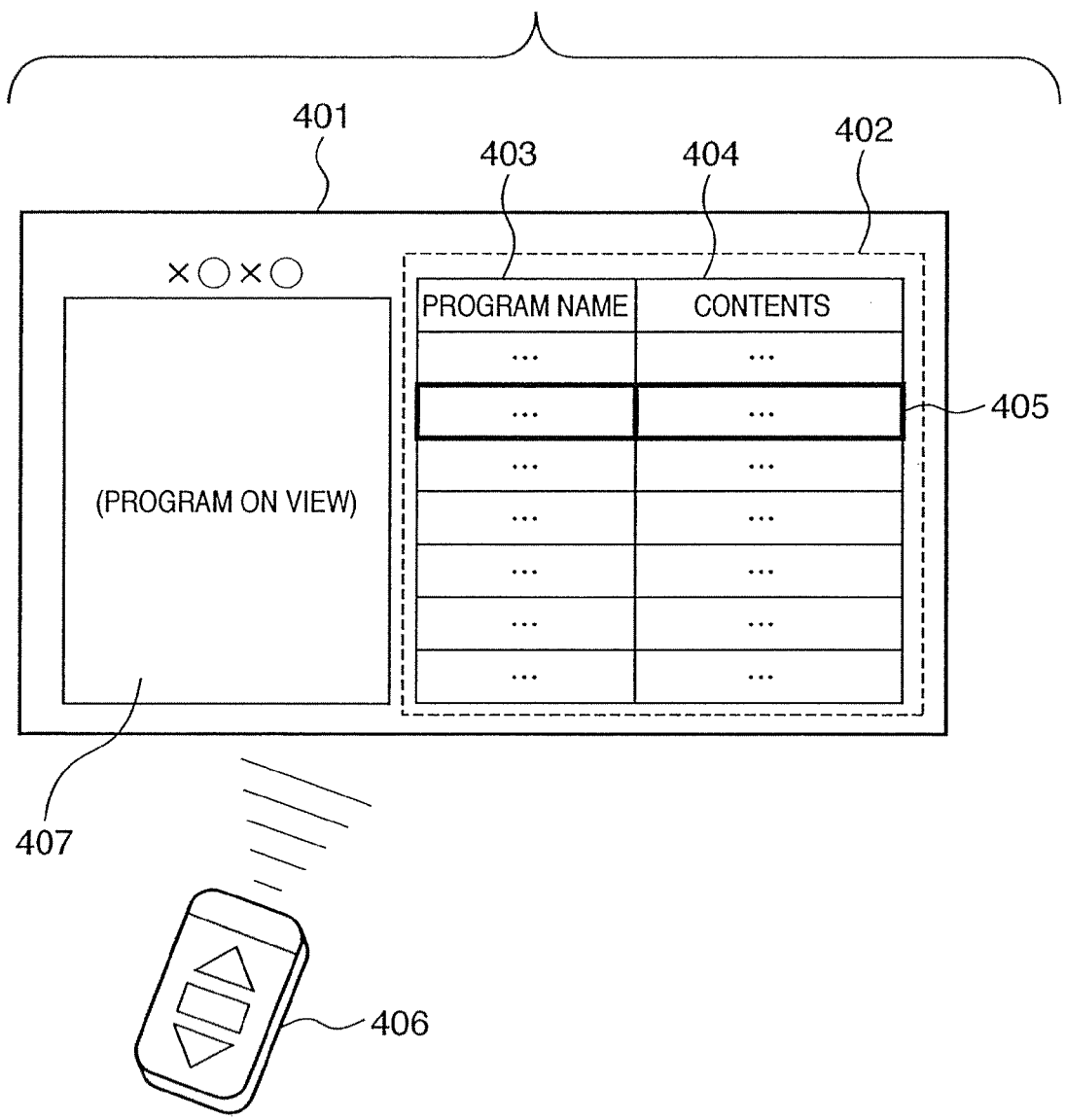
FIG. 5 is a view showing an example of a program table according to the first embodiment of the present invention.

FIG. 5 shows an example of a program table formed on the basis of the content list by the program table formation unit 108.

In FIG. 5, reference numeral 401 denotes the display window of the display device 114; and 402, a program table formed by the program table formation unit 108. The program table 402 shows a program name 403, program contents 404, and the like as information by which the user selects a program. Although the program name 403 and program contents 404 are displayed in FIG. 5, site information may also be displayed as the location of the program providing server 102. That is, information as a material for judgment by which the user selects a program may also be presented in the program table 402.

The user uses an input means such as a remote controller 406 to determine a content to be selected by vertically moving a Focus 405 in the program table 402. In a view window 407, the contents of the program selected by the Focus are simply displayed.

(Distance on Program Table)

The distance on a program table is the distance between a program (program on view) currently being selected and a candidate program (selection candidate program) to be selected next on a program table. This distance is equivalent to an operation amount required to select a candidate program from the state in which a given program is selected. In a presented program table, the distance is the minimum number of operations required to move the Focus 405 from a program on view to a selection candidate program.

Figures 6A, 6B:
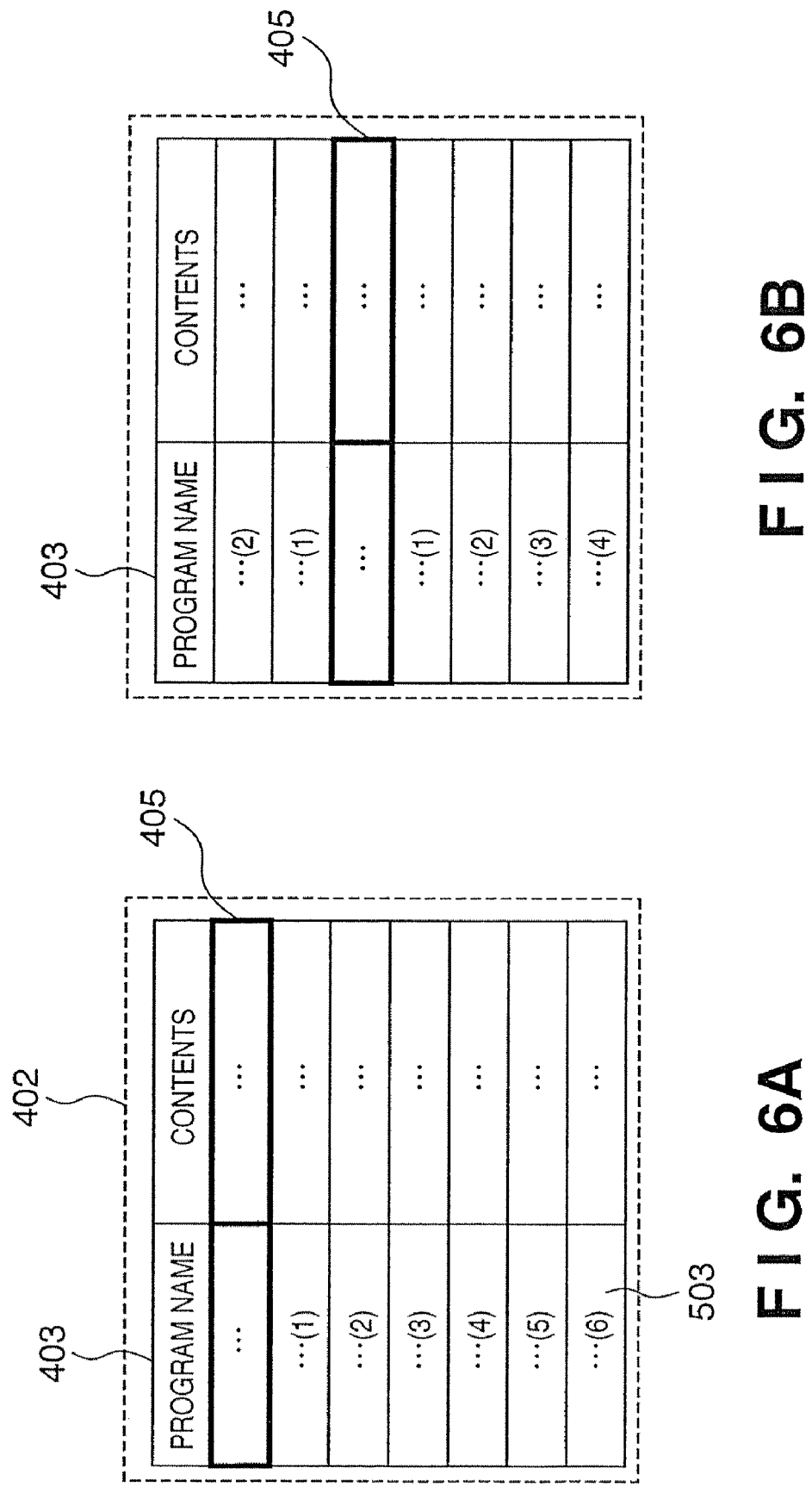
FIGS. 6A and 6B are views for explaining the distance on the program table according to the first embodiment of the present invention.

For the sake of explanation, FIGS. 6A and 6B illustrate only the program table.

First, the user vertically moves the Focus 405 and determines a desired program. Assume that, as shown in FIG. 6A, the user moves the Focus 405 and selects the uppermost program. The number of operations of moving the Focus 405 to the next selection candidate program is the distance on the program table. Therefore, assuming that the distance to a content in contact with the program on view is 1, the distances to contents below this content are 2, 3, 4 et sequentia. Although the numbers in ( ) indicate the distances to the individual contents in FIGS. 6A and 6B, these numbers are not actually displayed. For example, since seven contents are displayed in the form of a list in FIG. 6A, the distance to a lowermost program 503 is 6 when the uppermost program is selected by the Focus 405.

Assuming that the user moves the Focus 405 and selects a content in one middle row in the program table shown in FIG. 6B, described above, the distances to upper and lower contents adjacent to the program on view from are 1. Therefore, the distance to the lowermost program can be regarded as 4.

(Buffer Amount Control)

Figure 7:
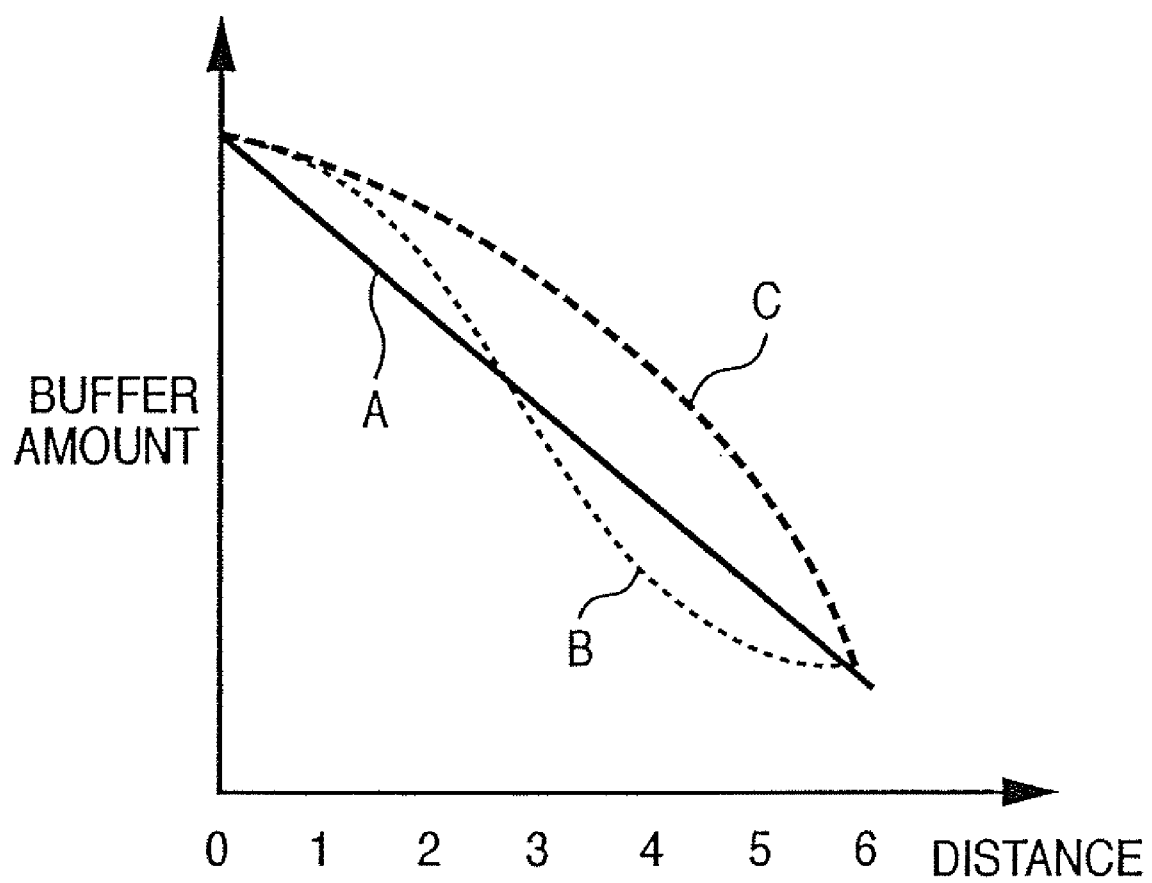
FIG. 7 is a graph showing the allocation of buffer amounts according to the first embodiment of the present invention.

Buffer amount control is performed for a plurality of selection candidate programs in accordance with the distances on the program table. FIG. 7 schematically shows the allocation of buffer amounts to the distances on the program table. For example, assume that the user moves the Focus 405 and selects the uppermost program as shown in FIG. 6A. In this case, the buffer amount is controlled as shown in FIG. 7 on the basis of the distance indicated in () of the program name column 403. Three types of control will be explained below.

A line A indicates an allocation method by which the buffer amount reduces in proportion to the distance on the program table. This control is preferably applied when the transmission speeds of communication paths between the broadcasting receiving apparatus 100 and the program providing servers 102 of the respective contents are nearly equivalent to each other (e.g., let one of a plurality of programs subjected to buffering be a reference program, all of the quotients obtained by dividing differences between receiving speeds of the reference program and other programs by the receiving speed of the reference program are within about 1%).

A curve B indicates an allocation method by which the shorter the distance to the program on view on the program table, the larger the buffer amount. For example, this method is based on a Gaussian distribution around the program on view as a central axis. This method is applied when the user looks the contents displayed on the program table in order from the top. This method is also applied when the memory amount available for buffering is small. That is, the method is preferably applied when the memory utilization need be increased compared to the method represented by the line A and a method represented by a curve C described below.

The curve C indicates an allocation method by which large buffer amounts are allocated to the individual contents around the program on view. This method is preferably applied when the usable memory amount is large compared to a case of the line A and curve B in a receiving apparatus such as a personal computer.

Figure 8:
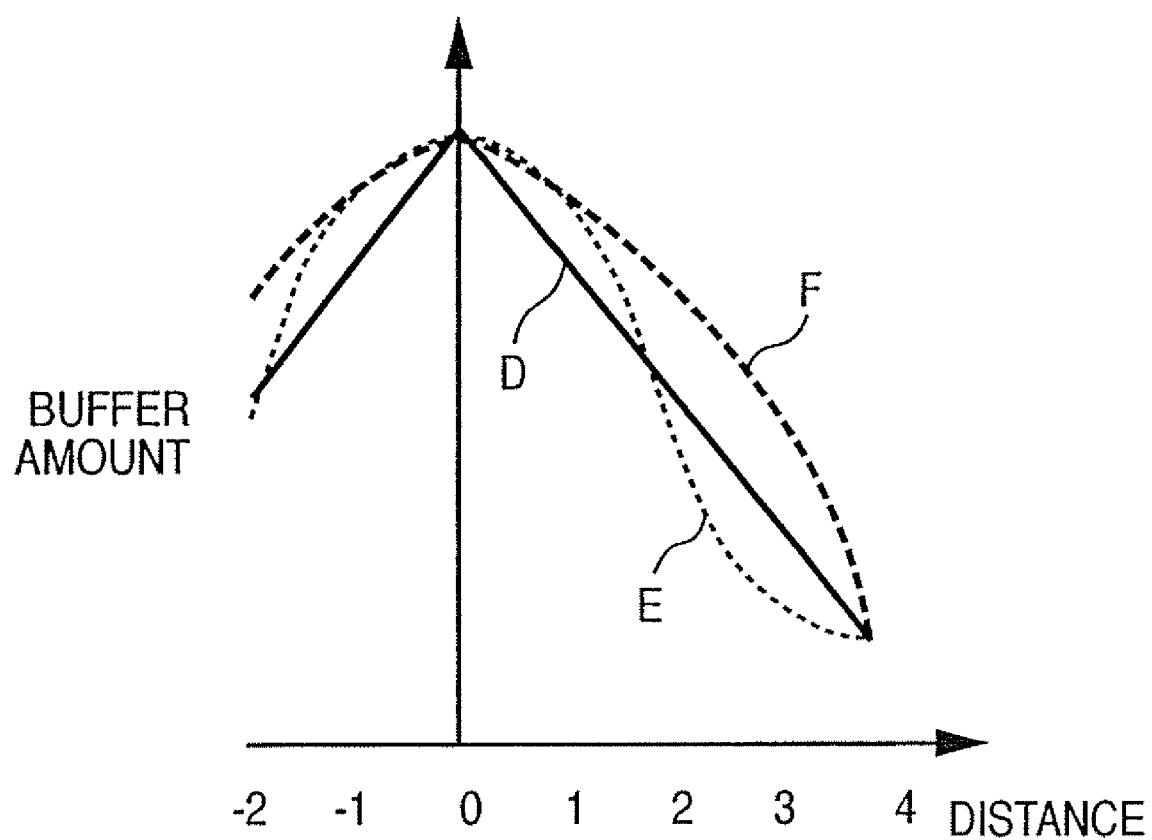
FIG. 8 is a graph showing the allocation of buffer amounts according to the first embodiment of the present invention.

Control when the user selects a program in one middle row in the program table 402 will be explained below with reference to FIG. 8.

Assume that, as shown in FIG. 6B, the user moves the Focus 405 and selects a program in one middle row. In this case, it is possible to control the buffer amount by directly applying the distance from the program on view to the graph shown in FIG. 7, or to control the buffer amount as shown in FIG. 8 by regarding the distance as a minus distance if the cursor moves up (in FIG. 6B) in the program table from the program on view and as a plus distance if the cursor moves down. Methods indicated by curves D, E, and F are similar to those shown in FIG. 7, so a detailed description thereof will be omitted.

(Buffering of Candidate Program)

The buffer amount is controlled as described above. In addition, the following control is performed in step S317 of FIG. 4 to store signals for playing back unselected programs into the buffer 107.

Figure 3:
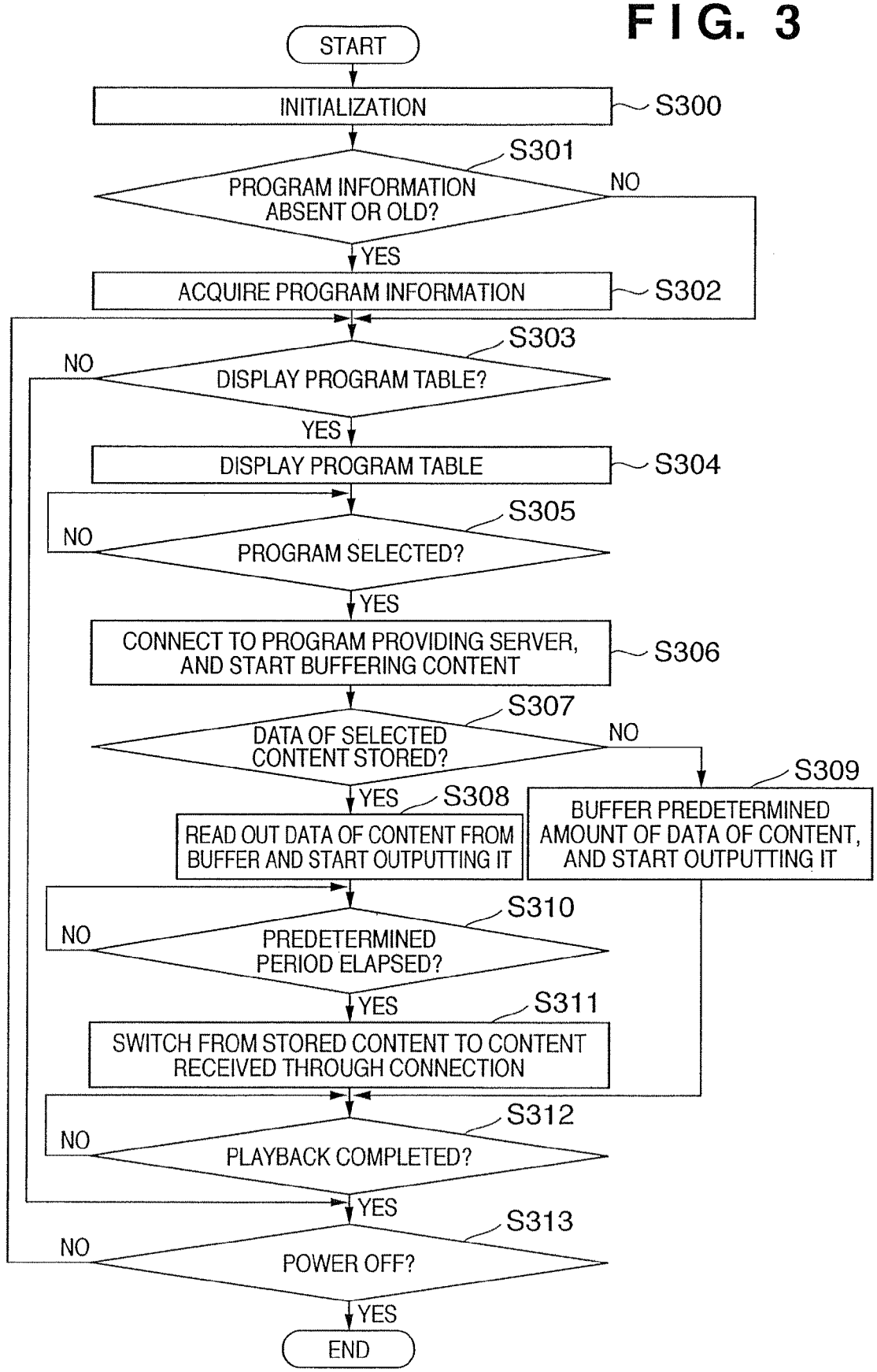
FIG. 3 is a flow chart showing the operation of the broadcasting receiving apparatus according to the first embodiment of the present invention.

The broadcasting receiving apparatus 100 requests transmission of unselected contents, in parallel with the transmission of the content selected by the user (the processing from step S306 in FIG. 3). The procedure of this transmission request is the same as that from transaction 205 in FIG. 2. In this embodiment, the transmission request is performed in order from a content having the shortest distance on the program table, and buffering is started.

In this buffering, after a predetermined portion of content data to be played back is stored, reception stop control is performed. The predetermined portion is data whose amount is smaller than minimum necessary data with which the content is automatically played back. That is, when a predetermined amount of content data is stored in the buffer 107 allocated by the buffer controller 106, playback of the content is automatically started. In this case, however, stop control is performed before an amount of data necessary to automatically start the playback is received.

As this stop control, the broadcasting receiving apparatus 100 can simply and forcedly disconnect the communication by closing the port. It is desirable, however, to transmit information for performing the stoppage to the transmission source of the unselected content. More specifically, information for requesting transmission stoppage may be transmitted. The procedure of this stoppage control is as follows.

First, the broadcasting receiving apparatus 100 transmits a disconnection request to the program providing server 102. When receiving this disconnection request, the program providing server 102 returns an acknowledgement to the broadcasting receiving apparatus 100, and subsequently transmits a disconnection request. When the broadcasting receiving apparatus 100 which has received this disconnection request returns an acknowledgement, the mutual connection is disconnected.

In the first embodiment as described above, images and sounds can be quickly output in response to channel switching. Also, the buffer amount of each content is controlled in accordance with the memory or the like of the broadcasting receiving apparatus. This increases the utilization of system resources.

The receiving apparatus according to the first embodiment comprises a receiver which receives an information data stream across a network, a data processor which processes the information data stream received by the receiver to make the information data stream displayable, a selector for selecting an arbitrary information data stream from a plurality of information data streams, and a storage device which stores a predetermined amount of a plurality of received information data streams, wherein a selected information data stream is received by the receiver and processed by the data processor, a predetermined number of information data streams other than the selected information data stream are stored in the storage device, and, if the selected information data stream is changed by the selector, the corresponding information data stream is read out from the storage means and processed by the data processor.

Second Embodiment

The second embodiment of the present invention will be described next.

The second embodiment relates to a buffer amount control method when buffering is performed for contents not displayed on the display window during the buffer amount control explained in the first embodiment.

In the second embodiment, the apparatus and system configuration, the transactions performed in the system, the operation of the broadcasting receiving apparatus, and the program table presenting method are the same as explained with reference to FIGS. 1 to 5 in the first embodiment, so a detailed description thereof will be omitted.

The distance on a program table and the buffer amount control as the characteristic features of the second embodiment will be described in detail below.

(Distance on Program Table)

Figures 9A, 9B:
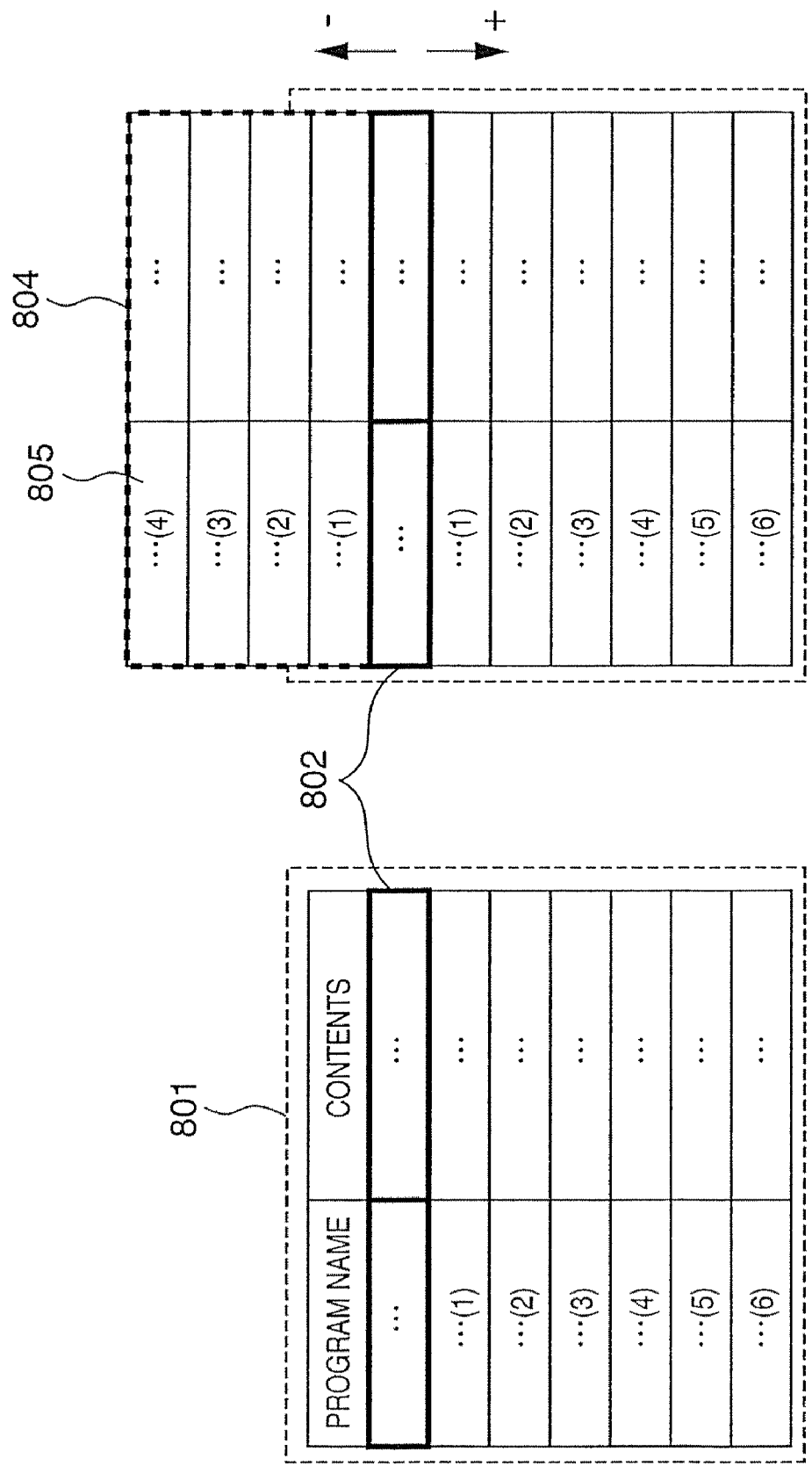
FIGS. 9A and 9B are views for explaining the distance on a program table according to a second embodiment of the present invention.

As the characteristic feature of the second embodiment, contents not presented on the screen are also considered as selection candidate programs in addition to those presented to a user. For example, assume that, as shown in FIG. 9A, a program table 801 is displayed and the user selects the uppermost program by using a Focus 802. If the minimum number of operations required to move the Focus to the next selection candidate program is defined as the distance on the program table, the distance to a content in contact with the program on view can be regarded as 1, and the distances to contents below this content can be regarded as 2, 3, 4 et sequentia, in the program table 801.

When the program table is displayed in the form of a list, there may be some contents which are not displayed in the program table 801. A program table 804 shown in FIG. 9B illustrates this concept. The distance from the program on view to each selection candidate program is indicated by the number in ( ) of a program name column 805.

(Buffer Amount Control)

Figure 10B:
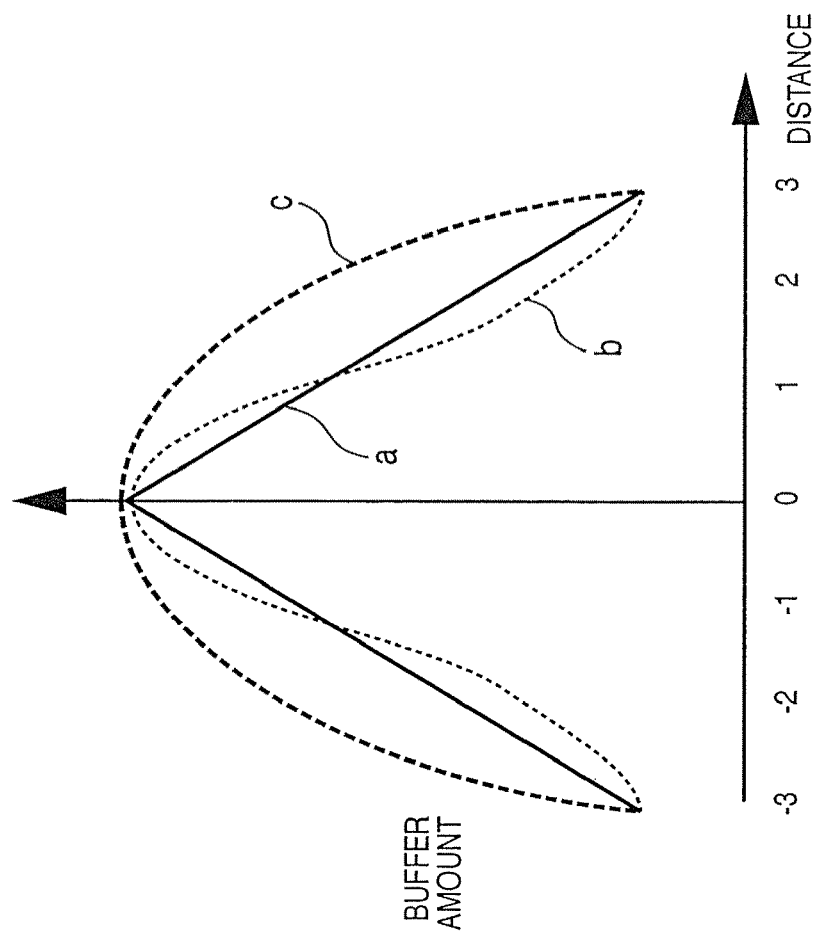
FIGS. 10A and 10B are views showing the allocation of buffer amounts according to the second embodiment of the present invention.
Figure 10A:
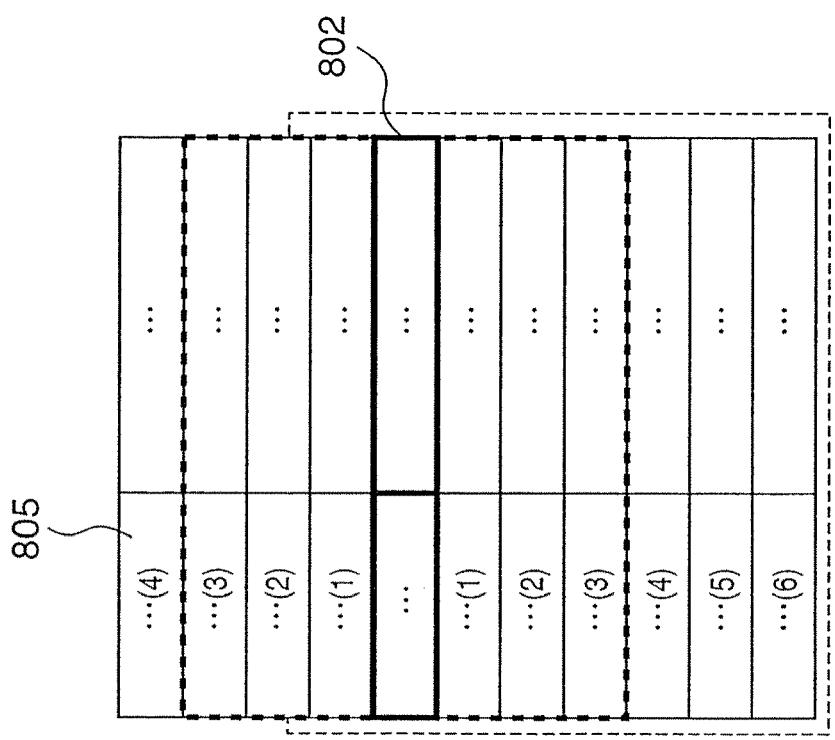

The buffer amounts are allocated to a plurality of selection candidate programs in accordance with the distances on the program table 804 described above. FIGS. 10A and 10B schematically illustrate the program table and the allocation of buffer amounts in the program table, respectively. For example, referring to FIG. 10A, assume that the user moves the Focus 802 and selects the uppermost program in the program table 801 shown in FIG. 9A. In this case, distances above and below the program on view on the program table 805 are regarded as minus distances and plus distances, respectively. When the distances on the program table described above are applied, the distance from the program on view to each selection candidate program is indicated by the number in ( ) of the program name column 805. Therefore, the buffer amount is controlled as shown in FIG. 10B.

That is, assuming that the distance to the program currently being viewed is 0, a buffer amount is ensured on the basis of the distance to the content on the program table. Application methods of curves A to C are the same as in the control explained with reference to FIG. 8 in the first embodiment, so a detailed description thereof will be omitted.

As in the first embodiment, it is also possible to regard the distance from the program on view as a plus distance regardless of the direction (upward or downward), and control the buffer amount by applying the graph shown in FIG. 7.

In the second embodiment described above, the same effects as in the first embodiment can be obtained even when contents not displayed on the window due to the size of the window are present. That is, in the second embodiment, if representative information explained in the first embodiment cannot be fully displayed on the display device, the display positional relationship to the representative information not displayed is obtained on the basis of a virtual display position.

Third Embodiment

The third embodiment of the present invention will be described below.

In the third embodiment, a buffer amount control method when a program table is displayed in a matrix manner will be explained.

In the third embodiment, the apparatus and system configuration, the transactions performed in the system, and the operation of the broadcasting receiving apparatus are the same as explained with reference to FIGS. 1 to 4 in the first embodiment, so a detailed description thereof will be omitted.

The program table presenting method, the distance on the program table, and the buffer amount control according to the third embodiment will be described in detail below.

(Program Table Presenting Method)

Figure 11:
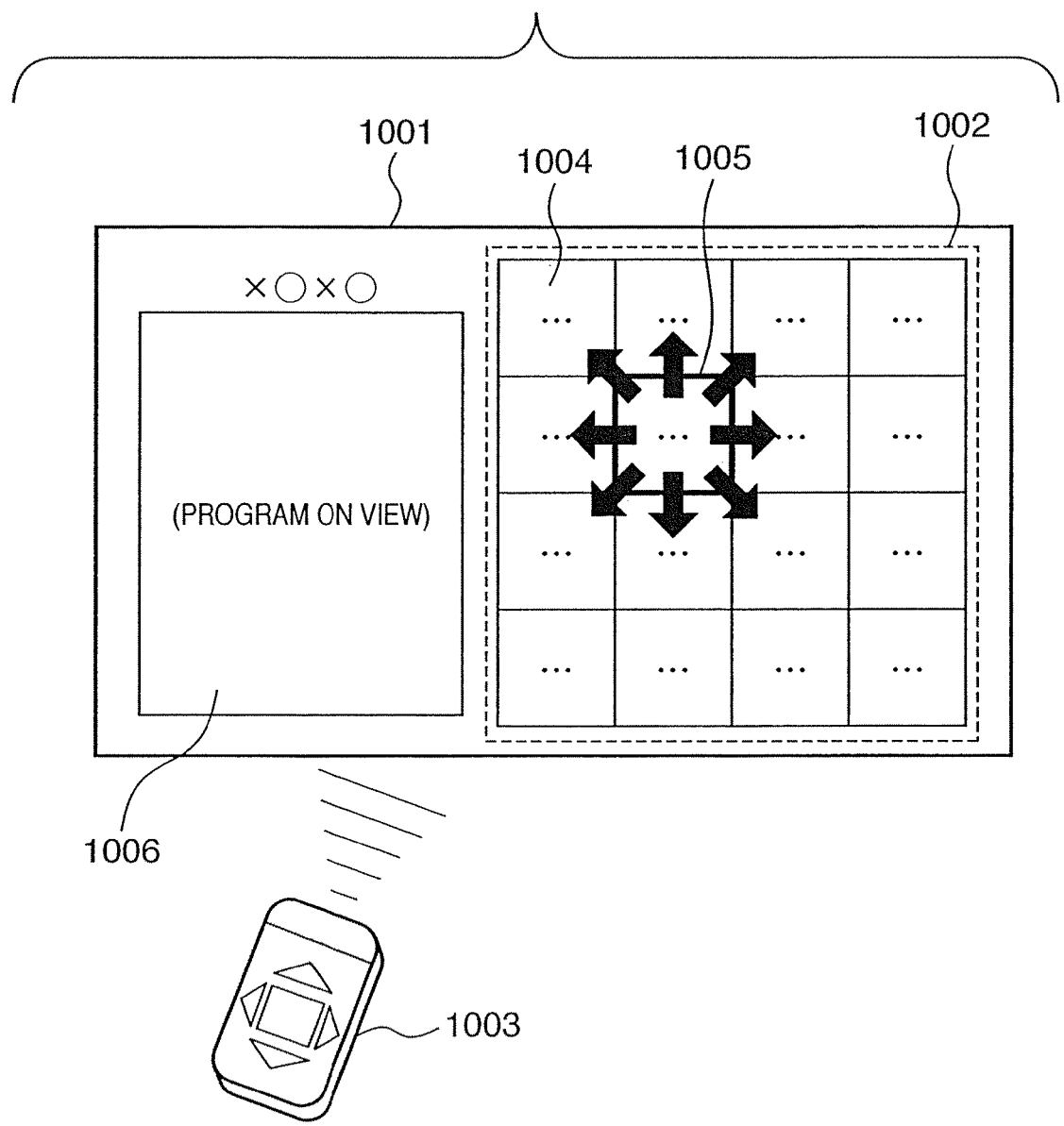
FIG. 11 is a view showing an example of a program table according to a third embodiment of the present invention.

FIG. 11 shows an example of a program table formed on the basis of a content list by a program table formation unit 108.

In FIG. 11, reference numeral 1001 denotes the display window of a display device 114 and 1002, a program table formed by the program table formation unit 108. The program table 1002 shows program names 1004 and the like as information by which the user selects a program.

The user determines a content to be selected by vertically, horizontally, and/or obliquely moving a Focus 1005 in the program table 1002 by using an input mean such as a remote controller 1003. In a view window 1006, the contents of the program selected by the Focus 1005 are simply displayed.

(Distance on Program Table)

As in the previous embodiments, the distance on a program table is the distance between a program on view and a candidate program to be selected next (selection candidate program) on the program table. More specifically, in the third embodiment, the distance is the minimum number of operations necessary to move the Focus 1005 vertically, horizontally, and/or obliquely from a program on view to a selection candidate program in a presented program table.

Figures 12A, 12B:
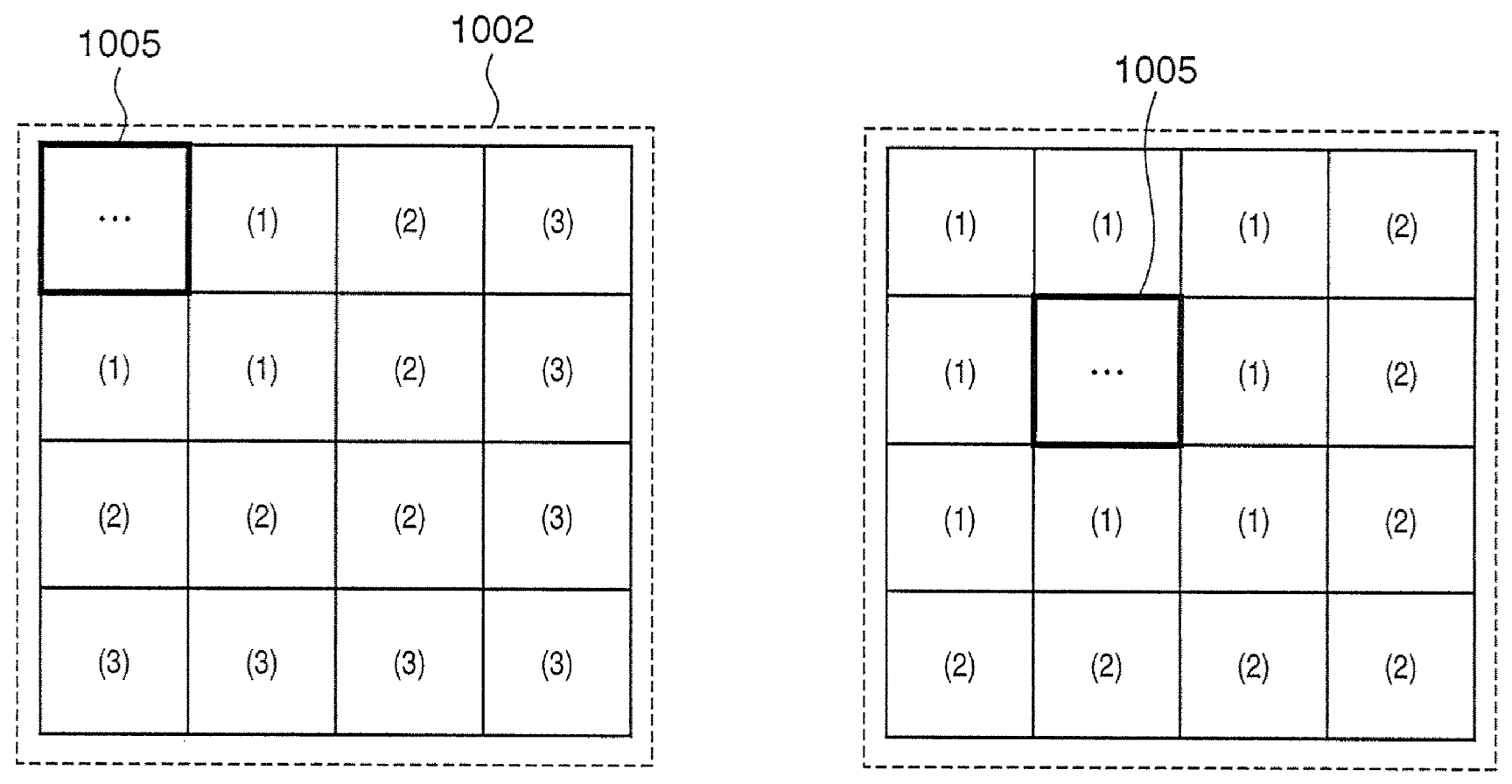

For the sake of explanation, FIGS. 12A and 12B illustrate only the program table 1002.

First, the user determines a content to be selected by vertically, horizontally, and/or obliquely moving the Focus 1005. Assume that, as shown in FIG. 12A, the user moves the Focus 1005 and selects a program in the upper left corner. The minimum number of operations of moving the Focus 1005 to the next selection candidate program is the distance on the program table. Therefore, assuming that the distances to contents in contact with the program on view from right, from below, and obliquely from lower right are 1 in the program table 1002, the distance from the program in the upper left corner to a content in the lower right corner is 3 in a case where 16 contents are displayed in a matrix manner as in FIG. 12A. Although the numbers in ( ) indicate the distances to the individual contents in FIGS. 12A and 12B, these numbers are not actually displayed.

Assume that the user moves the Focus 1005 and selects a content in one middle row in the program table as in FIG. 12B, described above, the distances to contents adjacent in all directions to this program on view are 1. Therefore, the distance to the program in the lower right corner is 2.

(Buffer Amount Control)

The buffer amounts are allocated as explained with reference to FIG. 7 in the first embodiment in accordance with the distances on the program table as shown in FIGS. 12A and 12B. This buffer amount allocation control is already described in detail in the first embodiment, so a detailed explanation thereof will be omitted.

In the third embodiment described above, the same effects as in the first embodiment can be obtained regardless of the arrangement of contents. That is, in the third embodiment, the display positional relationship is the minimum number of operations required by the designating means to designate representative information from another representative information already designated by the designating means.

Fourth Embodiment

The fourth embodiment of the present invention will be described below.

In the fourth embodiment, a buffer amount control method when a program table is displayed in a matrix manner and the Focus can be moved only vertically and horizontally will be explained.

In the fourth embodiment, the apparatus and system configuration, the transactions performed in the system, and the operation of the broadcasting receiving apparatus are the same as explained with reference to FIGS. 1 to 4 in the first embodiment, so a detailed description thereof will be omitted.

The distance on a program table and the buffer amount control according to the fourth embodiment will be described in detail below.

(Distance on Program Table)

Figure 13:
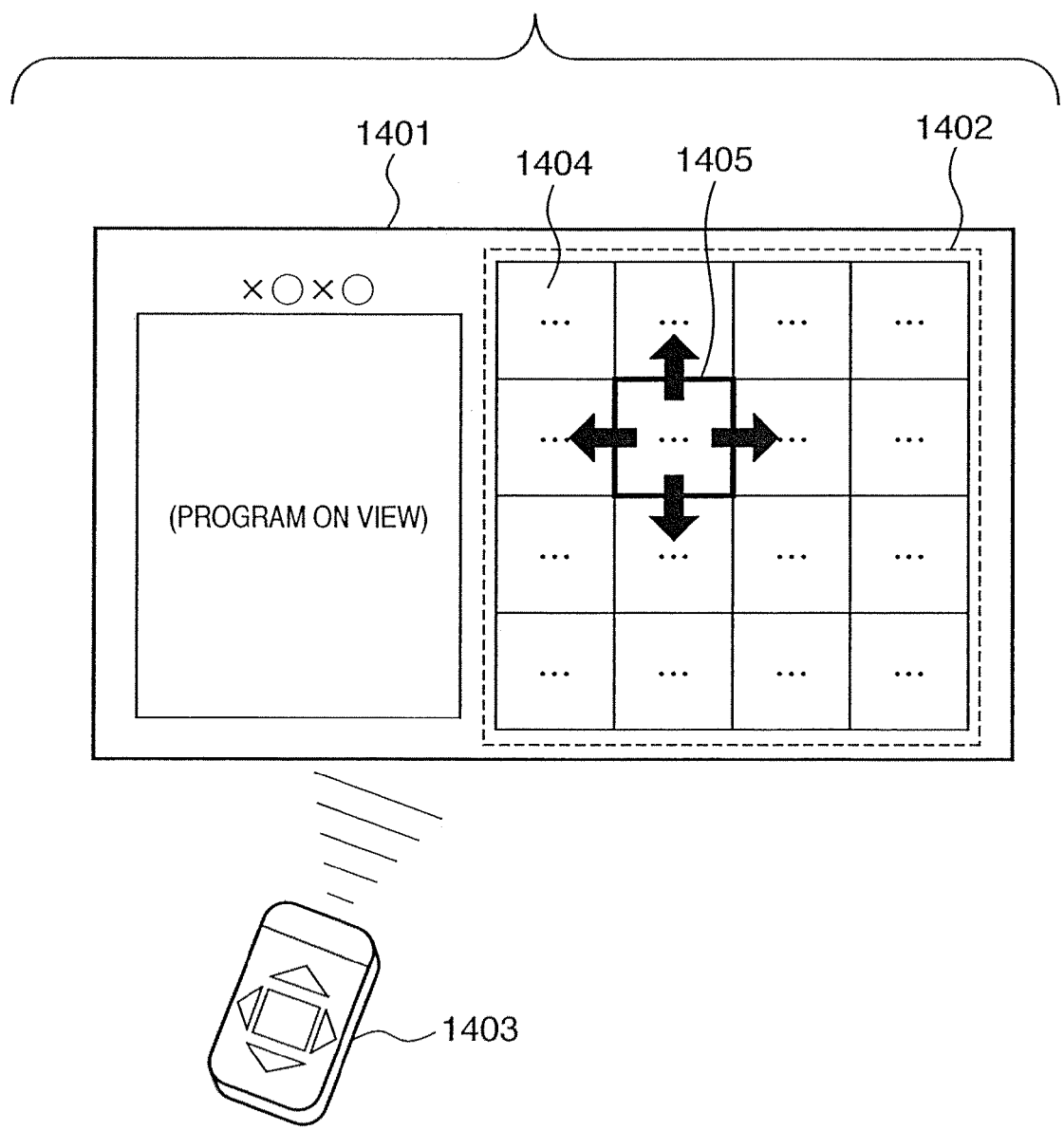
FIG. 13 is a view showing an example of a program table according to a fourth embodiment of the present invention.

As in the previous embodiments, the distance on a program table is the distance between a program on view and a candidate program (selection candidate program) to be selected next on the program table. More specifically, in the fourth embodiment, the distance is the minimum number of operations required to move the Focus vertically and/or horizontally from a program on view to a selection candidate program in a presented program table. In the fourth embodiment, as shown in FIG. 13, a Focus 1405 can be moved only vertically and horizontally in a program table 1402.

Figure 14A:
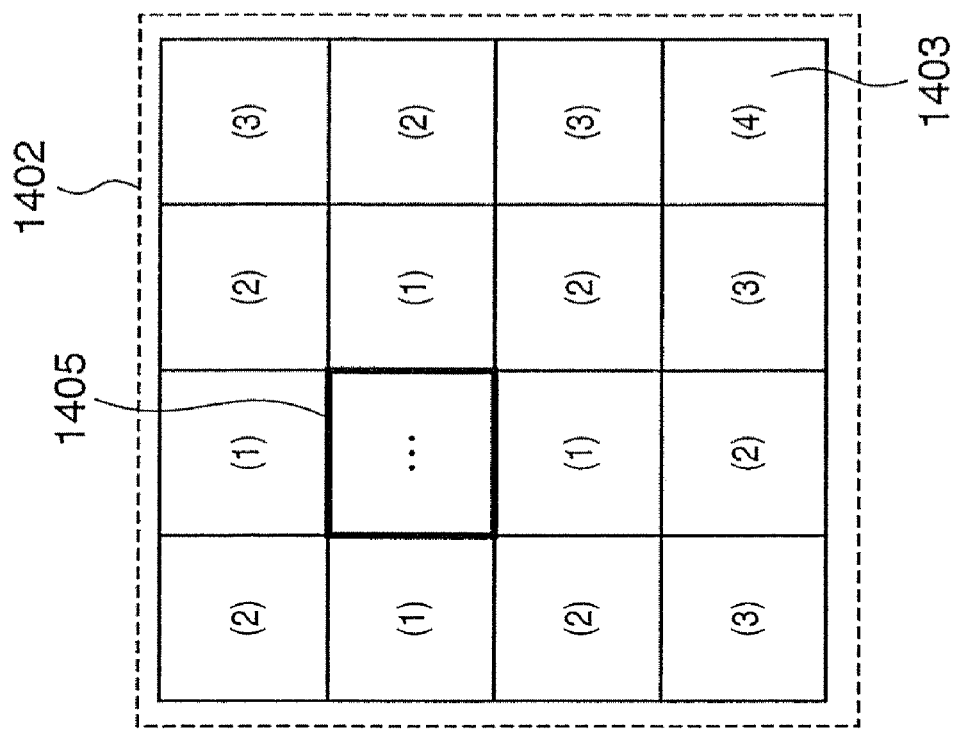
FIGS. 14A and 14B are views for explaining the distance on the program table according to the fourth embodiment of the present invention.

First, the user determines a content to be selected by vertically and/or horizontally moving the Focus 1405, Assuming that, as shown in FIG. 14A, the user moves the Focus 1405 and selects a program in the upper left corner. The minimum number of operations of moving the Focus 1405 to the next selection candidate program is the distance on the program table. Therefore, the distances to contents adjacent to the program on view from right and below are regarded as 1. When 16 contents are displayed as in a matrix manner in FIG. 14A, the distance to a content below the upper-left-corner program off to the right is regarded as 2, and the distance to a program in the lower right corner is regarded as 6. The Focus 1405 can be moved from the upper left corner to the lower right corner by moving the Focus 1405 to the right three times and to the left three times, that is, a total of six times.

Figure 14B:
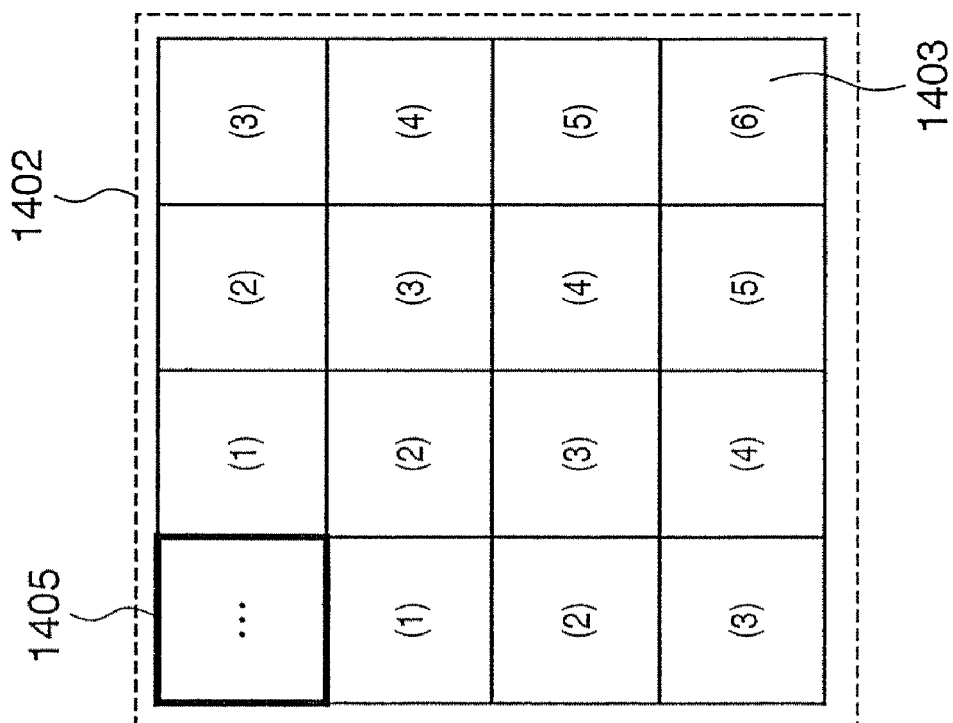

Also, assume that the user moves the Focus 1405 and selects a content in one middle row in the program table as in FIG. 14B. As described above, the distances to contents adjacent to this program on view from above, below, left, and right are 1, and the distances to contents in contact with the program on view obliquely from left and right are 2. Therefore, the distance to the program in the lower right corner is 4.

(Buffer Amount Control)

The buffer amounts are allocated as explained with reference to FIG. 7 in the first embodiment in accordance with the distances on the program table as shown in FIGS. 14A and 14B. This buffer amount allocation control is already described in detail in the first embodiment, so a detailed explanation thereof will be omitted.

In the fourth embodiment described above, the same effects as in the first embodiment can be obtained regardless of the arrangement of contents.

Fifth Embodiment

The fifth embodiment of the present invention will be described below.

In the fifth embodiment, when the buffer amount control explained in the first embodiment is performed, the buffer amount is controlled on the basis a user's operation (the position and moving direction of the Focus) until a program is selected.

FIG. 15 is a block diagram showing the configuration of a system including a broadcasting receiving apparatus to which a streaming receiving/playback method according to the fifth embodiment is applied.

The same reference numerals as in FIG. 1 denote the same parts in FIG. 15, and a detailed explanation thereof will be omitted. A broadcasting receiving apparatus 100' shown in FIG. 15 has a moving direction detector 120, instead of the position information detector 110 shown in FIG. 1. The moving direction detector 120 has a function of detecting the direction in which the Focus is moved by an operation controller 113.

In the fifth embodiment, the transactions performed in the system, the operation of the broadcasting receiving apparatus, and the program table presenting method are basically the same as explained with reference to FIGS. 2 to 5 in the first embodiment, so a detailed description thereof will be omitted. As described above, the position and moving direction of the Focus are used to determine position information in step S314 of FIG. 4, and the buffer amount is controlled on the basis of the thus obtained position information in step S315.

Details of the buffer amount control as the characteristic feature of the fifth embodiment will be described below.

(Buffer Amount Control)

For the sake of explanation, FIGS. 16A to 16C illustrate only a program table 402. Referring to FIGS. 16A to 16C, the numbers shown in ( ) in the program name column indicate the individual program IDs in the fifth embodiment.

FIG. 16A shows an image immediately after the user requests the program table. FIG. 17A shows an example of weighting of buffer amounts allocated to the individual contents in this case. FIG. 17A indicates that immediately after activation, equal buffer amounts are allocated not only to a program designated by a Focus 405 but also to other selection candidate programs.

To select a desired program from the displayed program table, the user moves the Focus 405 by operating various switches or a remote controller of the broadcasting receiving apparatus 100'. The moving direction detector 120 detects the moving direction of the Focus 405. This moving direction can be detected by hardware from direction keys of the remote controller or by software from calculations on the display window.

If the user wants to select a program 5 as shown in FIG. 16B, the Focus 405 must be moved down step by step. This movement of the Focus 405 indicates that the target content is present in the lower portion of the display window, so it is determined that the user is less interested in contents which the Focus 405 has passed by. That is, it is predicted that a program to be selected next is present in the moving direction of the Focus 405. FIG. 17B shows an example of weighting of buffer amounts allocated to the individual contents in this case. FIG. 17B demonstrates that large buffer amounts are allocated to programs in the lower portion of the screen in the moving direction of the Focus 405.

In contrast, if the Focus 405 is currently present at the program 5 and the user wants to select a program 2 as shown in FIG. 16C, the Focus 405 must be moved up step by step. This movement of the Focus 405 indicates that the target content is present in the upper portion of the display window. Therefore, the buffer amounts are weighted with respect to the individual contents as shown in FIG. 17C.

On the basis of the weights of buffer amounts obtained as shown in FIGS. 17A to 17C, the buffer amount when buffering is performed in parallel with the buffering of data of the selected content is given by (Buffer amount)=(total buffer amount)×{(buffer amount weight)/(total buffer amount weight)}

The buffer amount weights are held in the form of a table in the broadcasting receiving apparatus 100' for each moving direction of the Focus 405 and for each number of steps the Focus moves after the program table 402 is displayed and before a content is selected. The buffer amount weight can also be calculated by a nonlinear function by using the moving direction of the Focus and the number of steps of the movement.

The foregoing will be explained in detail below with reference to FIGS. 17A and 17B by assuming that the total buffer amount of the broadcasting receiving apparatus 100' according to the fifth embodiment is 196K bytes.

For the sake of explanation, assume that the programs 1 and 5 are contents of interest.

Immediately after the user requests the program table, the selection probabilities of the individual contents are the same as described previously. Therefore, the buffer amount weights are given as shown in FIG. 17A. In this state, the buffer amounts given to the programs 1 and 5 are $$(196K\ bytes) \times ((4)/(4 \times 7)) = 28K\ bytes$$

That is, equal buffer amounts are allocated.

Assuming that the Focus is moved down by a user's operation, and the buffer amount weights are given to the individual contents as shown in FIG. 17B, the buffer amount of the program 1 is:

$$(196K\ bytes) \times ((1)/(4 \times 7)) = 7K\ bytes$$

That is, the allocated buffer amount decreases.

Also, the buffer amount of the program 5 is:

$$(196K\ bytes) \times ((5)/(4 \times 7)) = 35K\ bytes$$

That is, the allocated buffer amount increases.

More specifically, in the fifth embodiment described above, the buffer amount in the storage means is allocated on the basis of the moving direction of the designating means on the display means.

Sixth Embodiment

The sixth embodiment of the present invention will be described below.

The sixth embodiment is characterized in that the vertical and horizontal moving directions of the Focus are reflected on the buffer amount weight, and, if the Focus stops for a predetermined time or longer, buffering is started without waiting for a user's program selecting operation.

FIG. 18 is a block diagram showing the configuration of a system including a broadcasting receiving apparatus to which a streaming receiving/playback method according to the sixth embodiment is applied.

The same reference numerals as in FIG. 1 denote the same parts in FIG. 18, and a detailed description thereof will be omitted. A broadcasting receiving apparatus 100" shown in FIG. 18 is obtained by adding a timer 130 to the broadcasting receiving apparatus 100' shown in FIG. 15. The timer 130 starts measuring the suspension time since a moving direction detector 120 detects the stoppage of movement of the Focus, and notifies the moving direction detector 120 of time lapse information if an arbitrary time is exceeded. When receiving the information indicating that the movement of the Focus has suspended for a predetermined time from the timer 130, the moving direction detector 120 requests a control unit 105 to start buffering.

In the sixth embodiment, the transactions performed in the system and the operation of the broadcasting receiving apparatus are basically the same as explained with reference to FIGS. 2 and 3 in the first embodiment, so a detailed description thereof will be omitted. The operation of the broadcasting receiving apparatus 100" is different in processing shown in FIG. 4 from the broadcasting receiving apparatus 100. Therefore, this operation will be explained below with reference a flow chart shown in FIG. 19.

Figure 19:
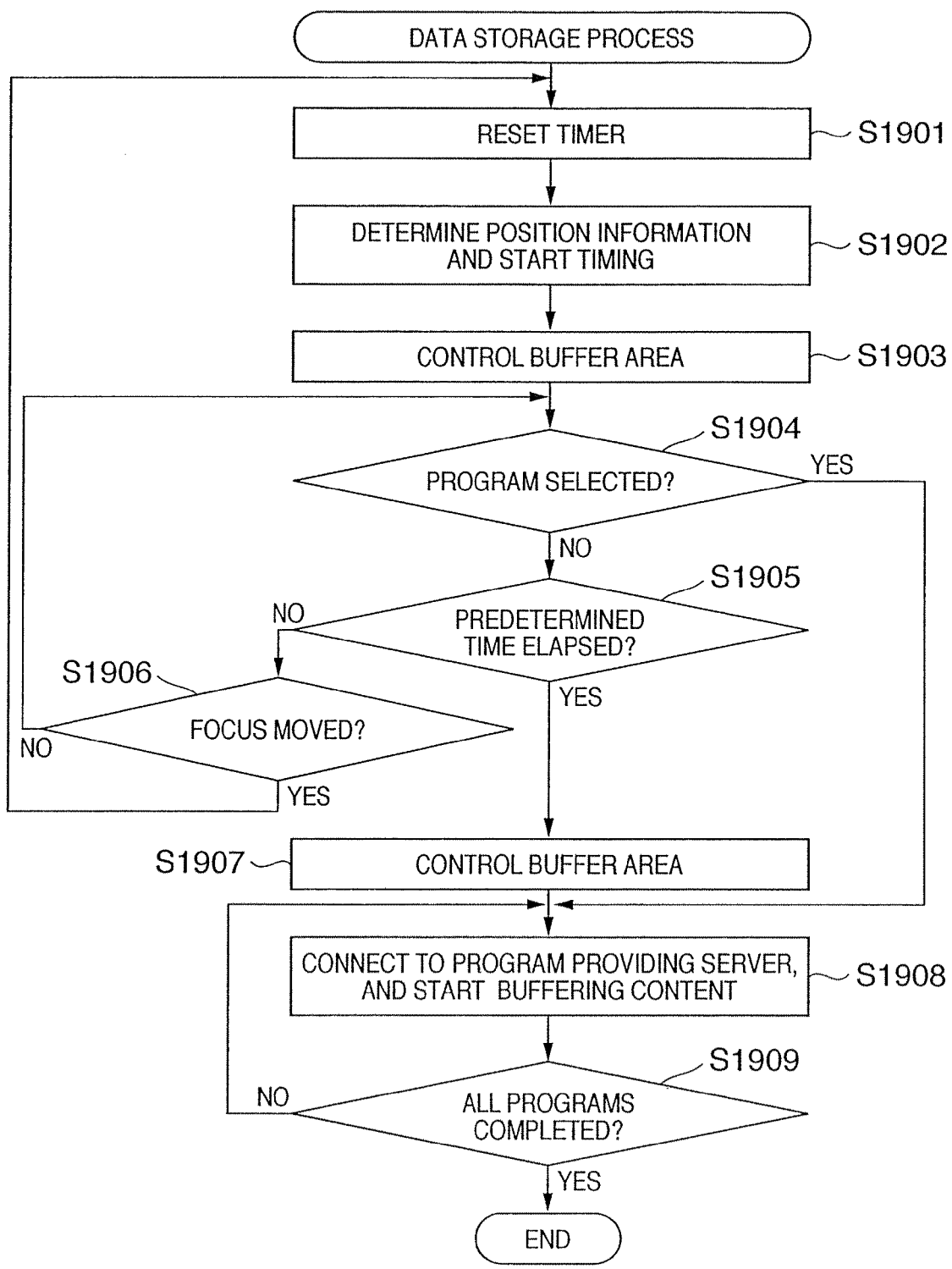
FIG. 19 is a flow chart showing a data storage process according to the sixth embodiment of the present invention.

In the sixth embodiment, when a program table is displayed in step S304 of FIG. 3, the processing shown in FIG. 19 is executed in parallel with the processing after step S304.

First, the timer 130 is reset in step S1901. If the Focus is moved by the user, the flow advances to step S1902, and the moving direction detector 120 detects position information including the direction in which the Focus is moved by an operation controller 113.

Subsequently, a buffer controller 106 performs area control (buffer amount control) for a buffer 107 for playing back streaming of candidate programs (step S1903). The method of controlling the buffer 107 will be described in detail later.

In step S1904, whether a program at which the Focus is currently positioned is selected by the operation of an enter key or the like is determined. This determination in step S1904 corresponds to the determination in step S305 of FIG. 3. If YES in step S1904, the flow advances to step S1908. If NO in step S1904, the flow advances to step S1905, and the timer 130 determines whether a predetermined time has elapsed. If NO in step S1905, the flow advances to step S1906 to determine whether the Focus has moved. If YES in step S1906, the flow returns to step S1901. If NO in step S1906, the flow returns to step S1904.

If the predetermined time has elapsed, time lapse information indicating the elapse of the predetermined time is supplied to the moving direction detector 120. This state in which the predetermined time has elapsed is the state in which the user has stopped the focusing operation for the predetermined time or longer. Upon receiving this time lapse information, the moving direction detector 120 causes the buffer controller 106 to perform area control (buffer amount control) for the buffer 107 again (step S1907). Then, the flow advances to step S1908. In step S1907, the control is so performed that a buffer amount with which playback is possible is not allocated to the program at which the Focus stops. Details of this control will be explained later.

In step S1908, with respect to the candidate program, the control unit 105 requests the connection information described above, notifies media information, and connects to a program providing server 102 in accordance with the connection protocol, following the same procedures as in step S317 of FIG. 4, and starts buffering of the streaming content of the candidate program.

When buffering of the buffer amount allocated by the buffer controller 106 is complete, the processing in step S1908 is repeated for the next candidate program (step S1909). The number of candidate programs can be set by the broadcasting receiving apparatus 100" and may be variable.

If the Focus position is changed and a program is selected by the operation of the enter key while steps S1908 and S1909 are being executed, it is also possible to interrupt the processing currently being executed, and return to step S1901 or S1902.

Details of the buffer amount control as the characteristic feature of the sixth embodiment will be described below.

(Buffer Amount Control)

In the sixth embodiment, a program table as shown in FIG. 13 of the fourth embodiment is displayed, and the Focus can be moved vertically and horizontally. For the sake of explanation, FIGS. 20A to 20E illustrate only a program table 1402. The user determines a content to be selected by vertically and/or horizontally moving a Focus 1405. Assume that the Focus 1405 is initially positioned at the second program from the left in the uppermost row, and a program in the third row and third column is to be selected.

FIG. 20A shows an image immediately after the user requests the program table. FIG. 20A shows an example of weighting of buffer amounts allocated to the individual contents in this case. Immediately after activation, as shown in FIG. 20A, equal buffer amounts are allocated not only to a program at which the Focus 1405 is present but also to other contents in the vertical and horizontal directions to which the Focus 1405 may move.

To move the Focus 1405 to the position of the program in the third row and second column from this state, the Focus 1405 must be moved down step by step. This indicates that the target content is present in the lower portion of the display window. In the sixth embodiment, when a moving direction detector 120 detects the moving direction of the Focus 1405, it is determined that the user is less interested in contents which the Focus 1405 has passed by. Accordingly, the buffer amount weights are changed as shown in FIG. 20B. In this manner, when the user designates the movement of the Focus 1405, large buffer amounts are allocated to programs in the lower portion of the screen in the moving direction of the Focus 1405. This buffer amount allocation corresponds to the processing performed in step S1903 of FIG. 19.

If the Focus 1405 stops in the state shown in FIG. 20B for a predetermined period, the buffer amount weights change from FIG. 20B to FIG. 20C. This is so because the characteristic feature of the sixth embodiment is that if the Focus stops in the same position for a predetermined time or longer, it is determined that a program at which the Focus stops is highly likely to be selected, so buffering is started. Also, in the example shown in FIG. 20C, the Focus 1405 can move to the left and right at the same probability, so the buffer amount weights are equal. Furthermore, the weight of the program at which the Focus 1405 stops also changes from FIG. 20B to FIG. 20C. This means that in the sixth embodiment, buffering is started when the Focus stops for a given time period, an amount with which playback is possible is not buffered. This buffer amount allocation corresponds to the processing performed in step S1907 of FIG. 19.

When the Focus 1405 is moved to an adjacent program on the right side, the buffer amount weights of the individual contents change to FIG. 20D. That is, it is determined that the target content is present on the right side of the display window, so large buffer amounts are allocated to contents on the right side of the screen (S1204).

When the user selects a program by pressing the enter key or the like, the buffer amounts change to FIG. 20E to reset the buffer amount of the selected content to an amount with which playback is possible, and buffering is started or restarted.

In the sixth embodiment, on the basis of the buffer amount weights of the individual contents, the buffer amount of a program as a selection candidate when buffering is performed in parallel with the buffering of data of the selected program is given by (Buffer amount)=(total buffer amount)×{(buffer amount weight)/(total buffer amount weight)}

That is, in the sixth embodiment, if the operation of the designating means stops for a predetermined time or longer, control is so performed that an information data stream corresponding to representative information designated at this stoppage and other information data streams are stored in the storage means.

Seventh Embodiment

The seventh embodiment of the present invention will be described below.

In the seventh embodiment, when a program is to be selected by freely moving a cursor by using a pointing device such as a mouse, the buffer amounts are controlled on the basis of the position, moving direction, and moving velocity of the cursor, and buffering is automatically started on the basis of the moving velocity.

Figure 21:
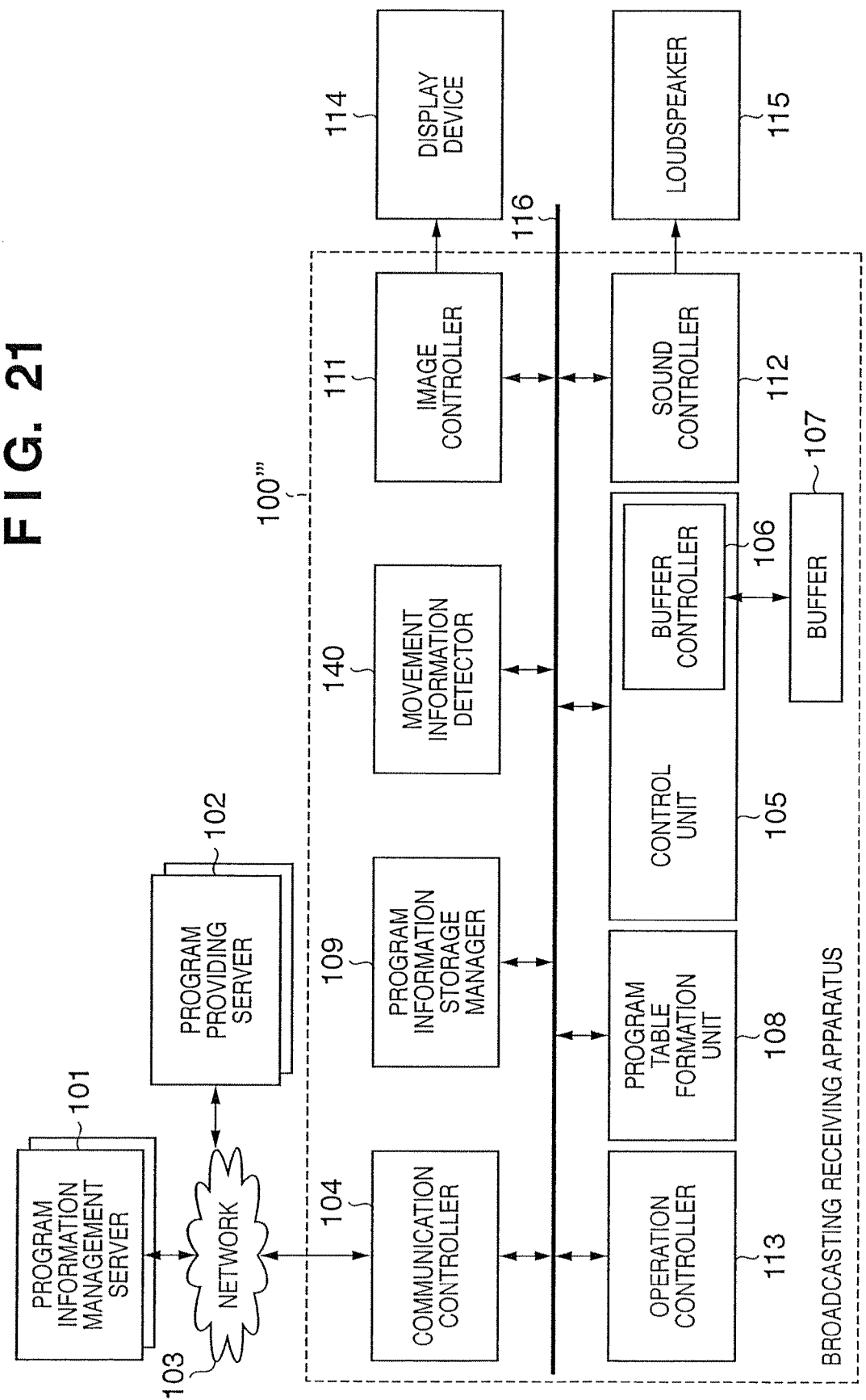
FIG. 21 is a block diagram showing the configuration of a system including a broadcasting receiving apparatus according to a seventh embodiment of the present invention.

FIG. 21 is a block diagram showing the configuration of a system including a broadcasting receiving apparatus to which a streaming receiving/playback method according to the seventh embodiment is applied.

The same reference numerals as in FIG. 1 denote the same parts in FIG. 21, and a detailed explanation thereof will be omitted. A broadcasting receiving apparatus 100''' shown in FIG. 21 is obtained by replacing the position information detector 110 of the broadcasting receiving apparatus 100 shown in FIG. 1 with a movement information detector 140. The movement information detector 140 has a function of detecting the position, moving direction, and moving velocity of the cursor controlled on the basis of inputs from an operation controller 113.

In the seventh embodiment, the transactions performed in the system and the operation of the broadcasting receiving apparatus are basically the same as explained with reference to FIGS. 2 and 3 in the first embodiment, so a detailed description thereof will be omitted. The operation of the broadcasting receiving apparatus 100''' differs in processing shown in FIG. 4 from that of the broadcasting receiving apparatus 100. Therefore, this operation will be described below with reference to a flow chart shown in FIG. 22.

Figure 22:
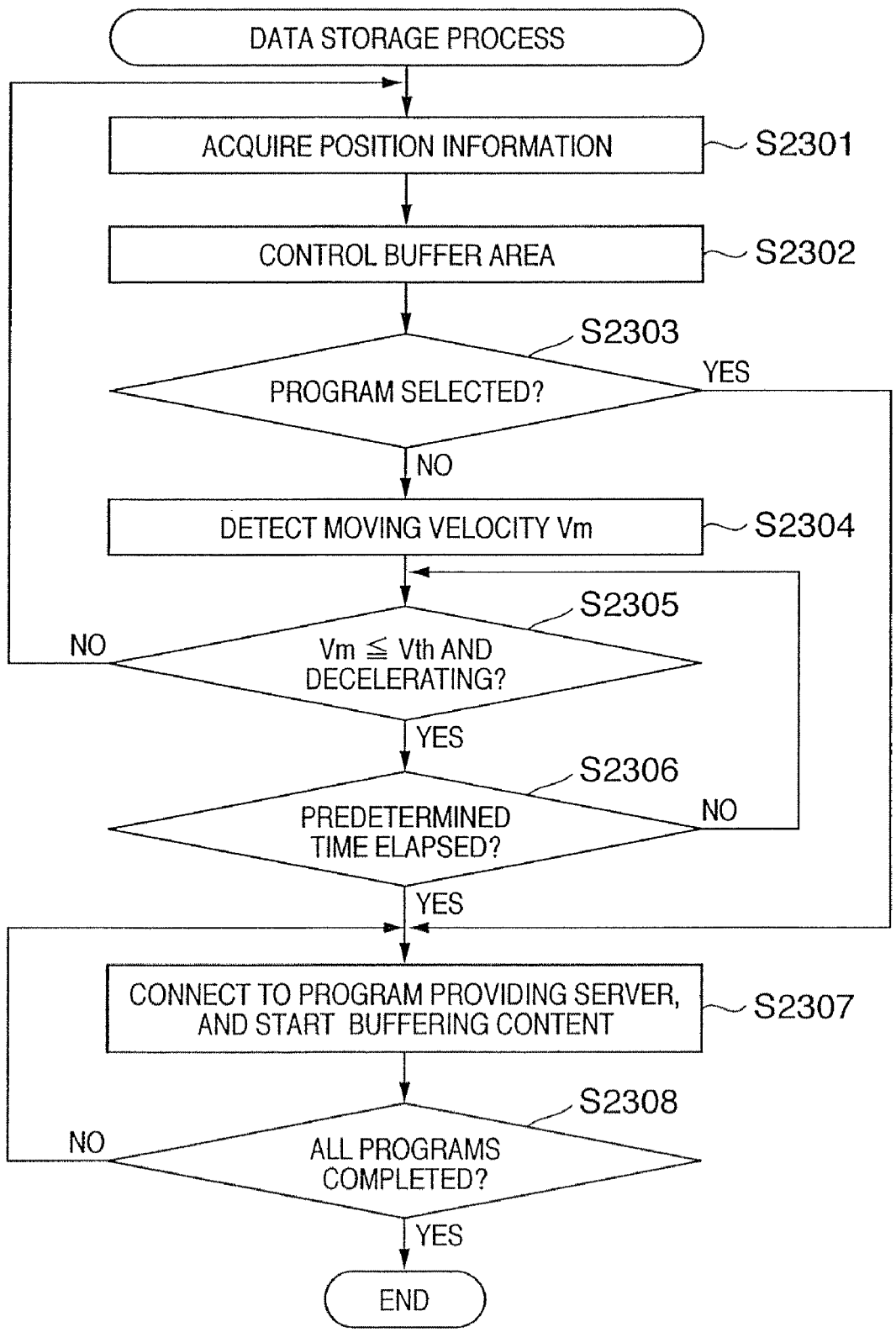
FIG. 22 is a flow chart showing a data storage process according to the seventh embodiment of the present invention.

In the seventh embodiment, when a program table is displayed in step S304 of FIG. 3, the processing shown in FIG. 22 is executed in parallel with the processing after step S304.

First, in step S2301, the movement information detector 140 detects the cursor position controlled by the operation controller 113, and analyzes the moving direction on the basis of the detected cursor position.

Subsequently, a buffer controller 106 performs area control (buffer amount control) for a buffer 107 for playing back streaming of a candidate program (step S2302). The method of controlling the buffer 107 will be explained in detail later.

In step S2303, whether a program is selected by the operation of an enter key or the like is determined. This determination in step S2303 corresponds to the determination in step S305 of FIG. 3. If YES in step S2303, the flow advances to step S2307. If NO in step S2303, the flow advances to step S2304, and the movement information detector 140 detects a moving velocity Vm of the cursor on the basis of internal time information of the system and the change amount of the cursor position. If the moving velocity Vm is higher than an arbitrary velocity Vth, it is determined that the cursor is moving, and the flow returns to step S2301. If the moving velocity Vm is increasing although it is lower than the arbitrary velocity Vth, the cursor presumably starts moving, so the flow returns to step S2301.

If the moving velocity Vm is lower than the arbitrary velocity Vth and decreases (if YES in step S2305), the flow advances to step S2306, and whether a predetermined time has elapsed since the moving velocity Vm becomes lower than the arbitrary velocity Vth is determined. If NO in step S2306, the flow returns to step S2305. If YES in step S2306, the flow advances to step S2307.

Figure 23:
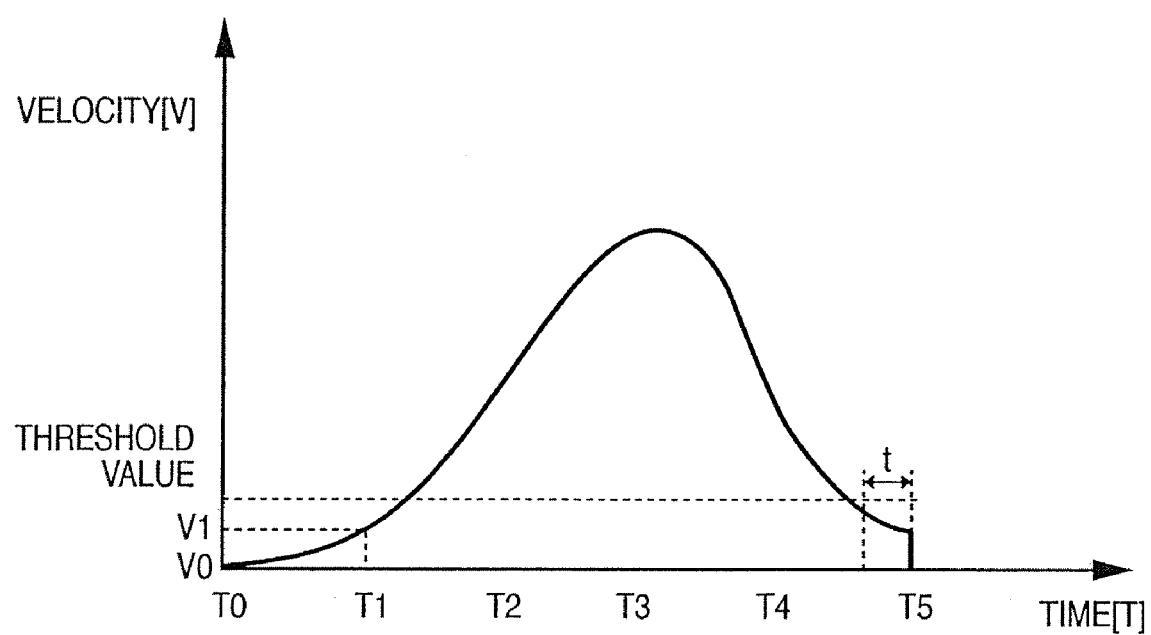
FIG. 23 is a graph for explaining the condition of the start of data storage according to the seventh embodiment of the present invention.

Steps S2305 and S2306 will be explained in detail below with reference to FIG. 23. FIG. 23 shows the state which meets the above conditions in a very short time t between time T4 and time T5. Velocity=0 at time T5 indicates that a program is selected.

The moving velocity of the cursor is lower than a threshold value between time T0 and time T1. However, when velocity V0 at time T0 is compared with velocity V1 at time T1, V0<V1 holds. Therefore, the above conditions are not met.

The moving velocity of the cursor is calculated from the distance the cursor moves for a given time, and the distance of the cursor is calculated from a geometric distance (to be described later) on the basis of coordinates in the screen coordinate system at time T. For example, when the cursor moving time is 0.2 sec and the cursor moving distance is 1,500 pixels, the cursor moving velocity is 7,500 pixels/sec.

If a program is selected or the above-mentioned conditions are met in step S2303, the flow advances to step S2307, and, with respect to the candidate program, the control unit 105 requests the connection information described earlier, notifies media information, and connects to a program providing server 102 in accordance with the connection protocol, following the same procedures as in step S317 of FIG. 4, and starts buffering of the streaming content of the candidate program.

In the seventh embodiment as described above, even when no program is selected, if the moving velocity of the cursor is lower than the arbitrary velocity Vth for a predetermined time and if this moving velocity is decreasing, it is predicted that a program pointed by the cursor is to be selected, and buffering is started. For example, when the threshold value of the velocity is 10 pixels and t=1 sec, the broadcasting receiving apparatus 100''' starts buffering if the moving velocity of the cursor is less than the threshold value for t sec.

When buffering of the buffer amount allocated by the buffer controller 106 is complete, the processing in step S2307 is repeated for the next candidate program (step S2308). The number of candidate programs can be set by the broadcasting receiving apparatus 100''' and may be variable.

If the cursor position is changed and a program is selected by the operation of the enter key while steps S2307 and S2308 are being executed, it is also possible to interrupt the processing currently being executed, and return to step S2301 or S2302.

The program table presenting method and the buffer amount control according to the seventh embodiment will be described in detail below.

(Program Table Presenting Method)

Figure 24:
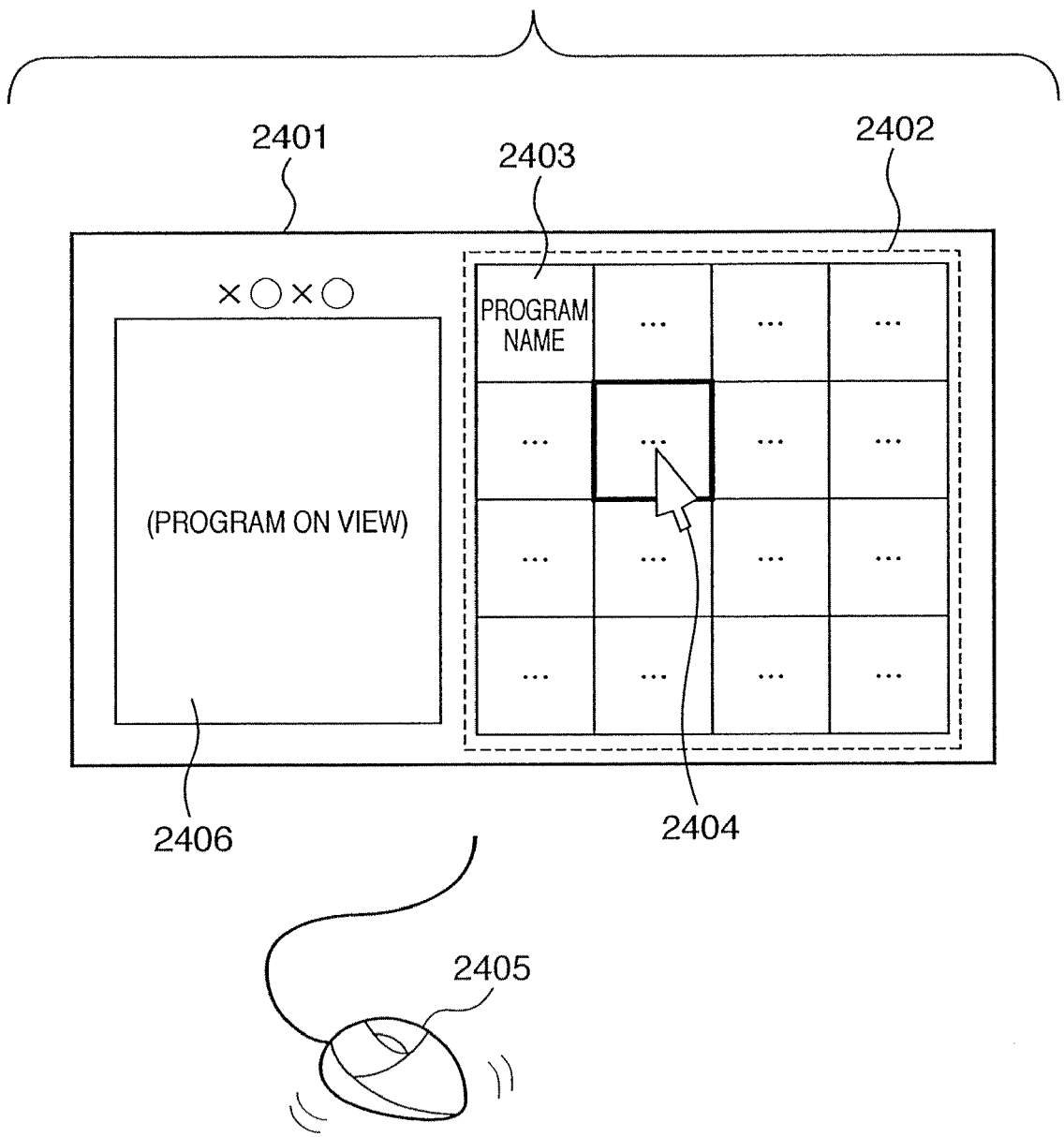
FIG. 24 is a view showing an example of a program table according to the seventh embodiment of the present invention.

FIG. 24 shows an example of a program table formed on the basis of a content list by a program table formation unit 108.

In FIG. 24, reference numeral 2401 denotes the display window of a display device 114; and 2402, a program table formed by the program table formation unit 108. The program table 2402 shows a program name 2403 and the like as information by which the user selects a program.

The user determines a content to be selected by freely moving a cursor 2404 in the program table 2402 by using input means such as a mouse 2405. In a view window 2406, the contents of the program selected by the cursor 2404 are simply displayed.

(Buffer Amount Control)

In the seventh embodiment, when the cursor 2404 starts moving, the moving direction of the cursor 2404 is reflected on the weights of buffer amounts allocated to selection candidate programs. A program to be selected is predicted on the basis of the moving velocity of the cursor 2404, and buffering is started in advance of actual selection of a program.

Figure 25A:
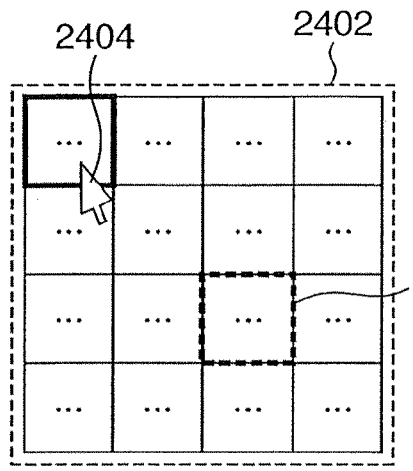
FIGS. 25A to 25E are views showing the distance and area on the program table according to the seventh embodiment of the present invention.

For the sake of explanation, FIGS. 25A to 25E illustrate only the program table 2402 shown in FIG. 24. The user determines a content to be selected by freely moving the cursor 2404. Assume that the cursor 2404 initially points at the leftmost program in the uppermost row, and a program 2510 is to be selected by moving the cursor 2404 at the shortest distance (FIG. 25A).

Figure 25B:
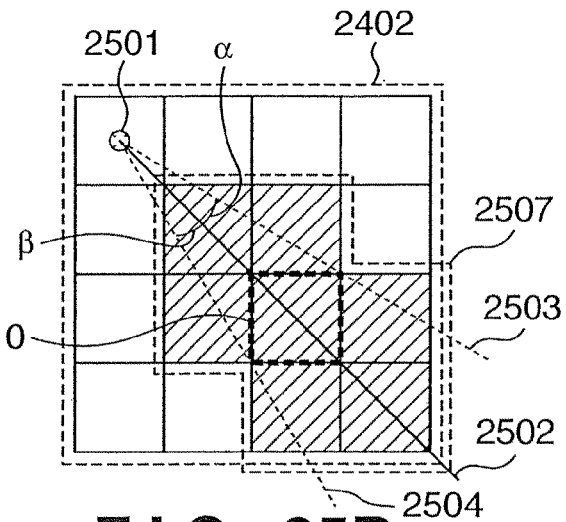

FIG. 25B is a view for explaining the positional relationship between the cursor moving direction and selection candidate programs in the program table 2402. A straight line 2502 indicates the shortest route from a start point 2501 of the cursor to the content 2510. Dotted lines 2503 and 2504 make arbitrary angles α and β, respectively, with the straight line 2502 from a point 2501 as an apex. Note that α and β are desirably 0°<α+β<90°. When α+β=0°, this method can be readily applied to the program table described in the fifth embodiment. When α+β=0°, however, determination is performed by assuming that an area (to be described later) on the program table 2402 is 1.

In the seventh embodiment, selection candidate programs are present in a portion where a region surrounded by the straight line 2502 and dotted lines 2503 and 2504 overlaps a program region on the program table 2402. Referring to FIG. 25B, for example, selection candidate programs are present in a hatched region 2507 surrounded by the broken lines.

Figure 25C:
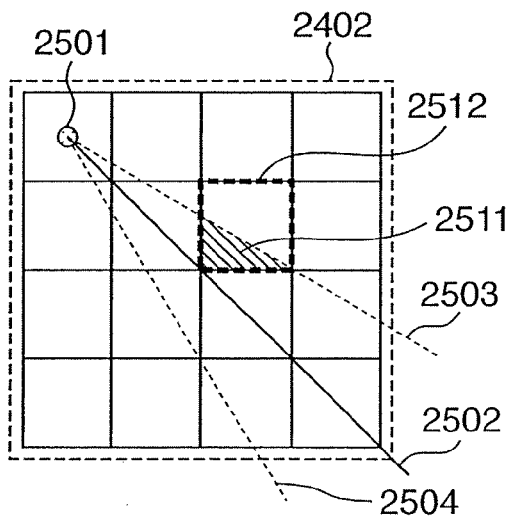

FIG. 25C is a view for explaining the way the weights of buffer amounts are allocated on the basis of the moving direction of the cursor. Referring to FIG. 25C, the weight of the buffer amount with respect to each selection candidate program is proportional to a overlapping portion of the area representing each selection candidate program with the fan-shaped areas determined by the straight line 2502 and dotted lines 2503 and 2504 (the overlapping portion is referred to as "Overlapping Area" hereinafter), and inversely proportional to the distance on the program table. That is, the buffer amount weight is given by Buffer amount weight=($w1$×Overlapping Area on program table)/($w2$×distance on program table)

where w1 and w2 are given coefficients and w1+w2=1. Following explains an example of calculating the buffer amount weight based on the above formula.

In FIG. 25C, a triangle 2511 indicates that area of a program 2512, which is contained in the fan-shaped area determined by the straight line 2502 and dotted lines 2503 and 2504. The shortest distance to the triangle 2511 on the program table is regarded as the distance on the program table.

Figure 25D:
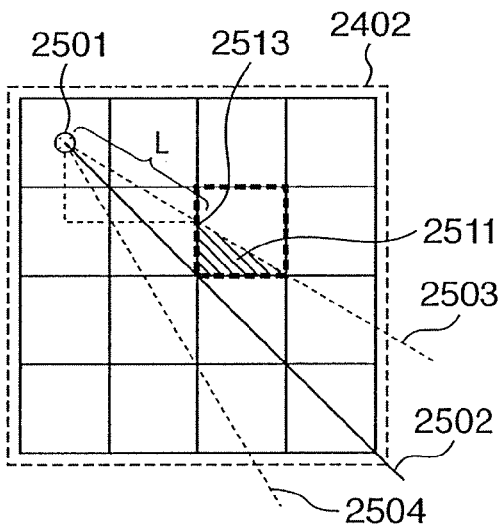

The shortest distance on the program table is calculated by the geometric distance from the start point 2501 of the cursor 2404 to an icon on the program table. FIG. 25D shows an example of this geometric distance. For example, the geometric distance is a distance L calculated by the Pythagorean theorem by letting (x0, y0) be the coordinates of the start point 2501 and (x1, y1) be the coordinates of a point 2513 at the shortest distance from the start point 2501 to the triangle 2511 in the screen coordinate system.

Figure 25E:
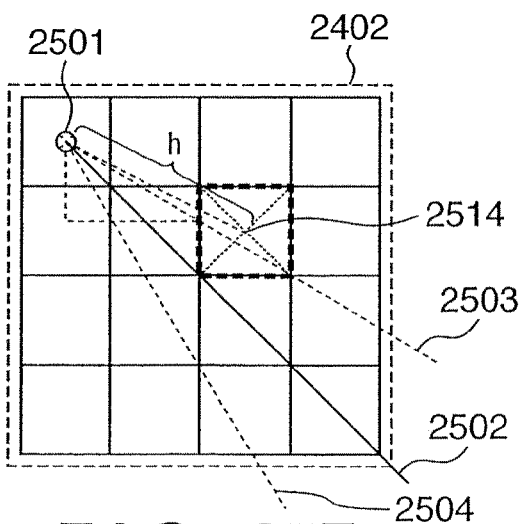

It is also possible to calculate the shortest distance by the distance from the start point 2501 of the cursor to the barycenter of an icon on the program table. That is, as shown in FIG. 25E, a distance h to the barycenter of an icon on the program table may also be used. The distance h is calculated by the Pythagorean theorem by letting (x0, y0) be the coordinates of the start point 2501 and (x2, y2) be the coordinates of a barycenter 2514 of an icon in the screen coordinate system. By this method, the distance between the cursor and each selection candidate program on the program table can be measured even if the shape of an icon is complicated.

Figure 26:
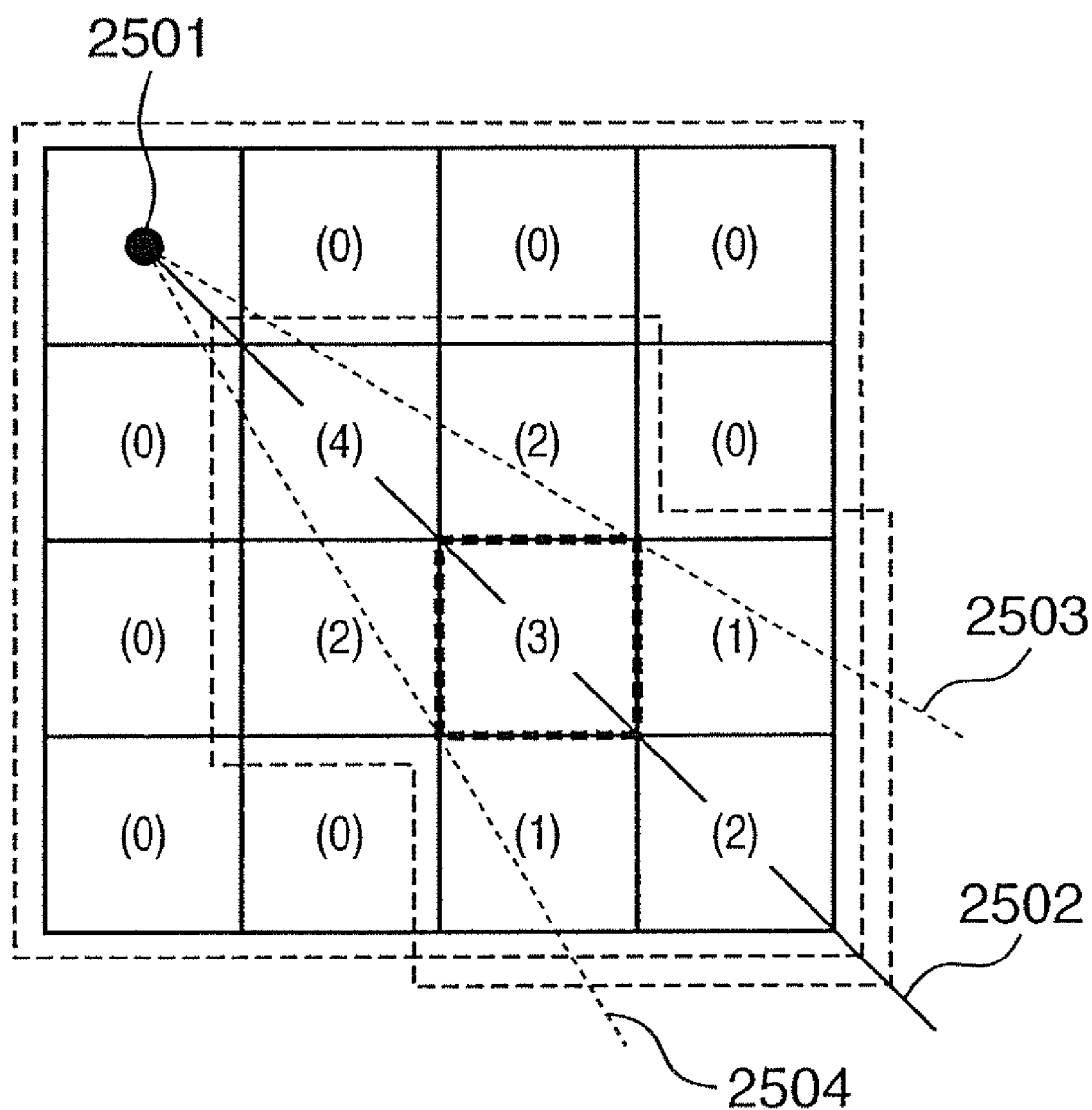
FIG. 26 is a view showing the allocation of buffer amounts according to the seventh embodiment of the present invention.

FIG. 26 shows examples of buffer amount weights allocated to selection candidate programs as explained above with reference to FIGS. 25A to 25E.

In a case where w1=0.2, w2=0.8, the overlapping area on the program table is 30,000 pixels, and the distance on the program table is 1,875 pixels, the buffer amount weight is 4 from the above equation. The value of w1 is inversely proportional to the angles α and β which the dotted lines 2503 and 2504 make with the straight line 2502, respectively. This is so because when the angles α and β increase, the directivity of the cursor weakens accordingly, so the influence of the overlapping area on the program table must be reduced.

In the seventh embodiment, on the basis of the weights of buffer amounts allocated to the individual contents, the buffer amount of each selection candidate program when buffering is performed in parallel with the buffering of a selected program is given by Buffer amount=total buffer amount×(buffer amount weight/total buffer amount weight)

where the total buffer amount is the total memory amount usable for buffering in the broadcasting receiving apparatus, and the total buffer amount weight is the total of the allocated buffer amount weights.

In the above explanation, it is assumed that the cursor moves along a straight line for the sake of simplicity. In practice, however, the movement of the cursor cannot be expressed by a straight line in many cases. Therefore, the method of detecting the moving direction will be described in more detail below with reference to FIGS. 27 and 28.

Figure 27:
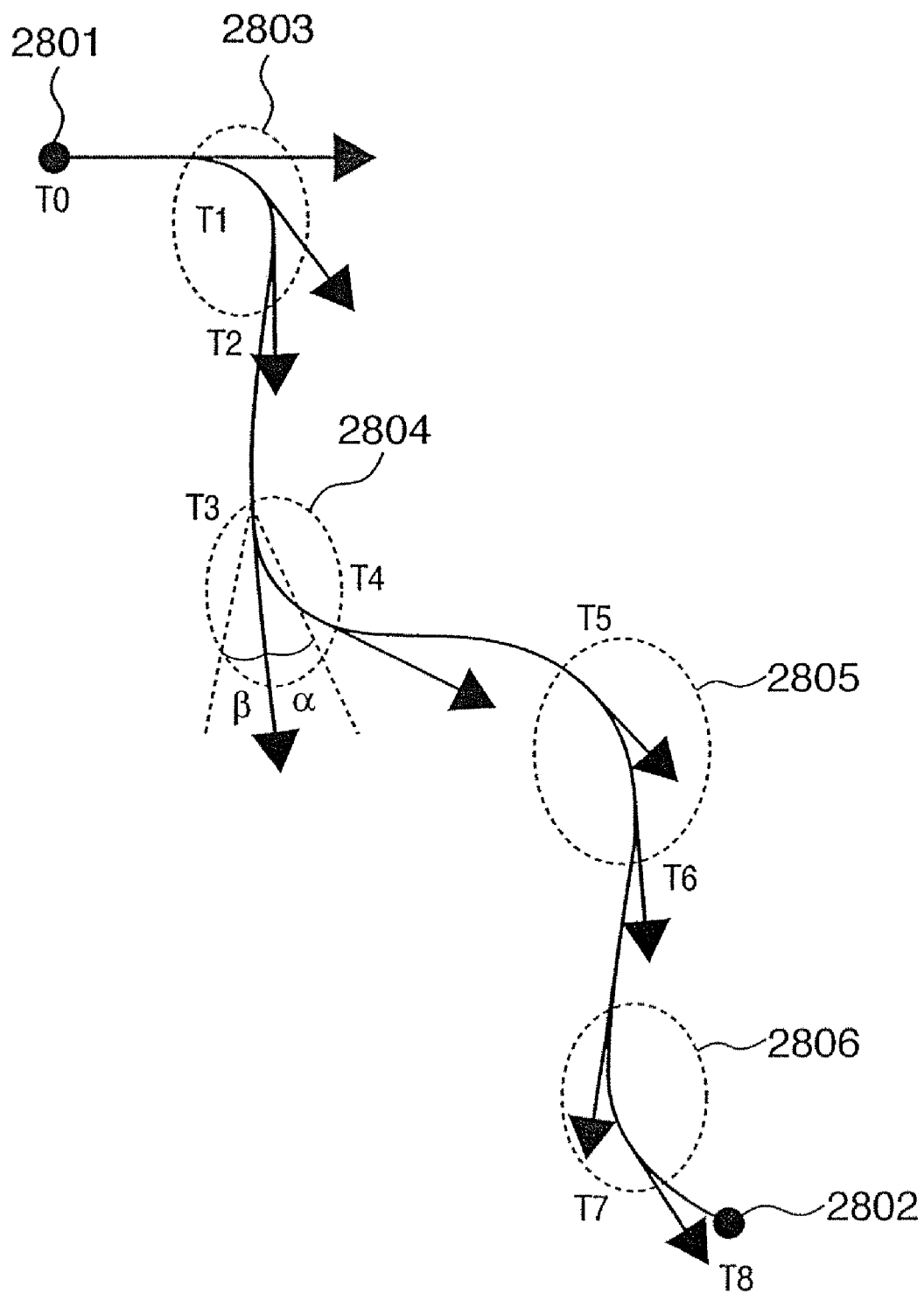
FIG. 27 is a schematic view showing the moving directions of a cursor according to the seventh embodiment of the present invention.
Figure 28:
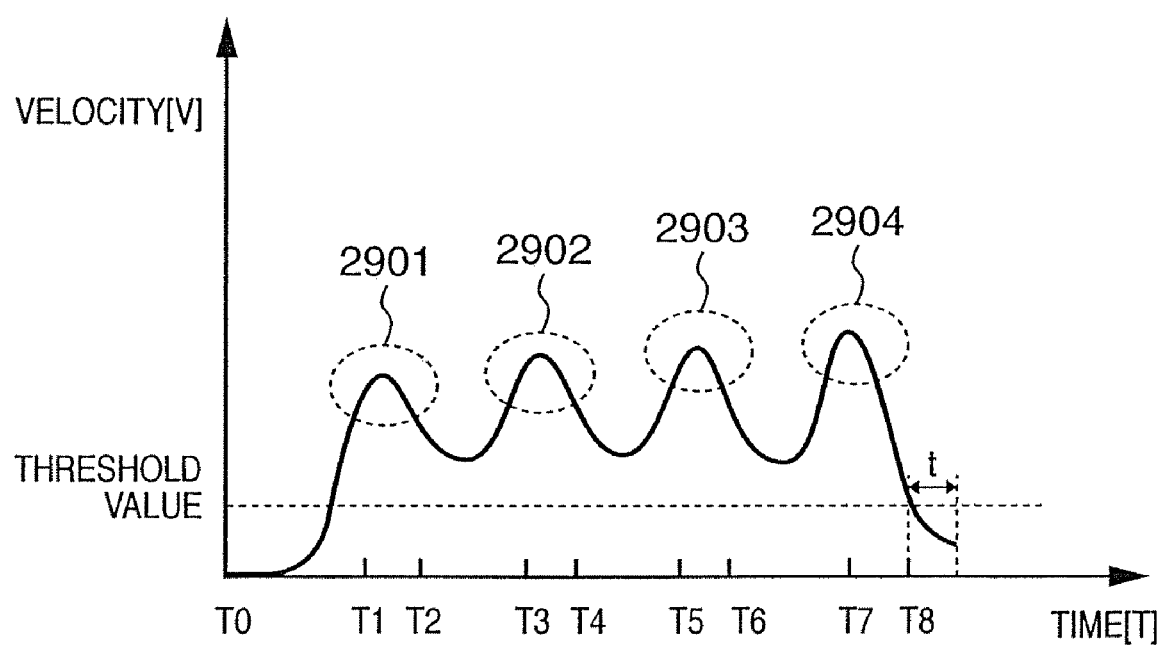
FIG. 28 is a graph showing the moving velocity of the cursor according to the seventh embodiment of the present invention.

FIG. 27 shows a locus when the cursor is moved from a start point 2801 to an end point 2802. FIG. 28 schematically shows the moving velocity of the cursor in FIG. 27. Referring to FIG. 27, each arrow indicates a direction vector at the point, and portions of the locus surrounded by dotted lines 2803, 2804, 2805, and 2806 correspond to portions of a graph surrounded by dotted lines 2901, 2902, 2903, and 2904, respectively, in FIG. 28.

The direction vector is calculated by a straight line connecting the start and end points of the cursor which has moved within a very short time Δt. If the moving direction of the cursor largely changes, that is, if the change amount of the direction vector is large (portion of locus surrounded by the dotted lines 2803, 2804, 2805, and 2806 in FIG. 27), the moving direction of the cursor can be monitored more accurately by finely dividing the sampling time. That is, in the seventh embodiment, the buffer amount in the storage means is allocated on the basis of the moving velocity of the designating means on the display means.

If the moving velocity of the designating means on the display means decreases to a predetermined velocity or lower for a predetermined time or longer, the control means stores, in the storage means, an information data stream corresponding to representative information designated at that point and other information data streams.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A receiving apparatus comprising:
a receiver that receives streaming data for use in playing back a streaming program;
a storage unit that stores the streaming data received by said receiver; and
a controller that, during a period in which a first streaming program is selected, starts control for starting reception of second streaming data for use in playing back a second streaming program different from the first streaming program, and, in response to a first predetermined amount of the second streaming data being stored in said storage unit during the period in which the first streaming program is selected, stops reception of the second streaming data.

2. The apparatus according to claim 1, wherein the control for stopping the reception of the second streaming data is to transmit information for performing the stoppage to a transmission source of the second streaming data.

3. The apparatus according to claim 1, wherein the control for starting the reception of the second streaming data includes at least control for requesting a transmission source of the second streaming data to transmit at least a portion of the second streaming data.

4. The apparatus according to claim 1, wherein the apparatus is capable of automatic playback of the second streaming program, and wherein the first predetermined amount of the second streaming data, stored in said storage unit during a period in which the first streaming program is selected, is a data amount with which automatic playback of the second streaming program is not started.

5. The apparatus according to claim 1, wherein said controller starts control for starting reception of third streaming data for use in playing back a third streaming program different from the first and second streaming programs during the period in which the first streaming program is selected, and, when a second predetermined amount of the third streaming data is stored in said storage unit during the period in which the first streaming program is selected, performs control for stopping reception of the third streaming data.

6. The apparatus according to claim 5, wherein when the first predetermined amount of the second streaming data is stored in said storage unit during the period in which the first streaming program is selected, said controller performs control for stopping reception of the second streaming data, and, when a second predetermined amount of the third streaming data is stored in said storage unit during the period in which the first streaming program is selected, said controller performs control for stopping reception of the third streaming data, the first predetermined amount being larger than the second predetermined amount.

7. The apparatus according to claim 6, wherein the second and third streaming programs satisfy a relationship in which an operation amount when a state in which the first streaming program is selected is switched to a state in which the third streaming program is selected is larger than an operation amount when the state in which the first streaming program is selected is switched to a state in which the second streaming program is selected.

8. The apparatus according to claim 6, wherein the third streaming program is a streaming program selected before the first streaming program is selected, the first streaming program is selected by operating a predetermined operation key from a state in which the third streaming program is selected, and the second streaming program is a streaming program which can be selected by performing the same operation on said operation key from a state in which the first streaming program is selected.

9. A method of controlling a receiving apparatus comprising:
receiving first streaming data for use in playing back a first streaming program;
storing the first streaming data in a storage unit of the receiving apparatus;
receiving second streaming data for use in playing back a second streaming program different from the first streaming program during the period in which the first streaming program is selected;
storing the second streaming data in the storage unit; and
stopping, in response to a predetermined amount of the second streaming data being stored in the storage unit during the period in which the first streaming program is selected, reception of the second streaming data.

* * * * *